(12) United States Patent
Watanabe et al.

(10) Patent No.: US 9,995,923 B2
(45) Date of Patent: Jun. 12, 2018

(54) CONTROL APPARATUS AND CONTROL METHOD FOR SPATIAL LIGHT MODULATOR

(71) Applicant: HAMAMATSU PHOTONICS K.K., Hamamatsu-shi, Shizuoka (JP)

(72) Inventors: Koyo Watanabe, Hamamatsu (JP); Takashi Inoue, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 203 days.

(21) Appl. No.: 15/164,052

(22) Filed: May 25, 2016

(65) Prior Publication Data

US 2016/0349496 A1    Dec. 1, 2016

(30) Foreign Application Priority Data

May 27, 2015  (JP) ................................ 2015-107489
Mar. 23, 2016  (JP) ................................ 2016-058308

(51) Int. Cl.
*G02B 21/36* (2006.01)
*G02B 21/06* (2006.01)
*G02F 1/01* (2006.01)

(52) U.S. Cl.
CPC ........... *G02B 21/365* (2013.01); *G02B 21/06* (2013.01); *G02F 1/0121* (2013.01)

(58) Field of Classification Search
CPC ...... G02B 21/365; G02B 21/06; G02F 1/0121
USPC ......................................................... 348/79
See application file for complete search history.

(56) References Cited

U.S. PATENT DOCUMENTS

| 2011/0006231 A1* | 1/2011 | Betzig | G01J 9/00 250/578.1 |
| 2011/0193269 A1* | 8/2011 | Ito | B23K 26/032 264/400 |
| 2016/0266368 A1* | 9/2016 | Watanabe | G02B 21/10 |
| 2016/0320600 A1* | 11/2016 | Dake | G02B 21/06 |

OTHER PUBLICATIONS

Kevin O'Holleran et al., "Polarization effects on contrast in structured illumination microscopy", Optics Letters, vol. 37, Issue 22, 2012, p. 4603-p. 4605.

* cited by examiner

*Primary Examiner* — Jay Patel
*Assistant Examiner* — Marnie Matt
(74) *Attorney, Agent, or Firm* — Drinker Biddle & Reath LLP

(57) ABSTRACT

A control apparatus includes a lens, an SLM presenting a modulation pattern on a modulation plane and outputting modulated light L2 for forming light spots P1 and P2 on a pupil plane of the lens, an imaging device imaging a fringe pattern image formed on a focal plane of the lens and generating image data Da indicating the fringe pattern image, a calculation unit calculating at least one kind of parameter among an intensity amplitude, a phase shift amount, and an intensity average from the image data Da, an analysis unit obtaining a deviation in relative positions of an optical axis of the lens and a reference coordinate of the modulation plane based on the parameter, and a changing unit changing an origin position of the reference coordinate so that the deviation in the relative positions is decreased.

10 Claims, 21 Drawing Sheets

$f_{k=1}(\eta+a, \xi+b, D_1, \alpha_1)$ $f_{k=2}(\eta+c, \xi+d, D_2, \alpha_2)$

CONTROL APPARATUS AND CONTROL METHOD FOR SPATIAL LIGHT MODULATOR

BACKGROUND OF THE INVENTION

Field of the Invention

An aspect of the present invention relates to a control apparatus and a control method for a spatial light modulator.

Related Background Art

In Non-Patent Document 1, it is disclosed that a contrast of a fringe pattern image formed on a focal plane of an objective lens varies according to a position of a light spot formed on a pupil plane of the objective lens.

Non-Patent Document 1: Kevin O'Holleran and Michael Shaw, "Polarization effects on contrast in structured illumination microscopy", Optics Letters, Vol. 37, Issue 22, pp. 4603-4605 (2012)

SUMMARY OF THE INVENTION

Recently, for example, a technology of controlling conditions of illumination light for illuminating an object (such as plane illumination, point illumination, structured illumination, or pattern illumination) is researched in a field of an optical microscope or the like. For example, it is possible to realize various illumination systems such as total reflection illumination by controlling an intensity or a phase of modulated light on a pupil plane of an objective lens. However, in a case where such an illumination system only includes optical elements such as a lens, mechanical control for installing or switching the optical element becomes necessary when an illumination condition is changed, and thus, an illumination condition is limited and a size of an apparatus is increased.

In order to solve this problem, it is considered to use a spatial light modulator (SLM). That is, an intensity or a phase of light on a pupil plane of a lens is controlled by modulation of light which is input into the lens by an SLM. In this case, it becomes possible to realize an electric illumination system that does not require a mechanical operation, and thus, it becomes possible to switch an illumination condition freely and to downsize an apparatus.

However, there is the following problem in such a system. In order to control an intensity or a phase of light on a pupil plane of a lens by an SLM and to realize a desired illumination condition, it is preferable that relative positions of an optical axis of the lens and a reference coordinate axis of a modulation pattern presented on the SLM accurately match with each other. FIG. 21 is a view schematically illustrating a relative positional relationship between a pupil plane 101 of a lens and a modulation plane 102 of an SLM. An $\eta$-$\xi$ orthogonal coordinate system is defined on the pupil plane 101 and an x-y orthogonal coordinate system is defined on the modulation plane 102.

A modulation pattern on the modulation plane 102 is created with this x-y orthogonal coordinate system as a reference coordinate, however, when an origin of the x-y orthogonal coordinate system and an origin of the $\eta$-$\xi$ orthogonal coordinate system are deviated from each other (case where these origins are identical is illustrated in FIG. 21), an image formed on the pupil plane 101 is deviated from an original image. Thus, it is not possible to accurately realize a desired illumination condition on a focal plane of the lens. Note that it can be also considered to mechanically adjust positions where the SLM and the lens are installed in order to solve such a problem, however, such a mechanical adjustment needs a lot of time and effort and there is a limit in accuracy.

An object of an aspect of the present invention is to provide a control apparatus and a control method for a spatial light modulator, with which it is possible to accurately make relative positions of an optical axis of a lens and a reference coordinate axis of a modulation pattern presented on an SLM match with each other.

In order to solve the above problem, a control apparatus for a spatial light modulator according to one aspect of the present invention includes a lens; a spatial light modulator including a modulation plane, in which a plurality of modulation pixels are arrayed two-dimensionally, and configured to modulate light based on a first modulation pattern and output first modulated light for forming a first light spot and a second light spot on a pupil plane of the lens; an image sensor including an imaging plane, in which a plurality of photoelectric conversion pixels are arrayed two-dimensionally, and configured to capture an image of a first fringe pattern image formed on a focal plane of the lens by the first modulated light on the imaging plane and generate first image data indicating a light intensity distribution of the first fringe pattern image; and a processor electrically coupled to the image sensor and the spatial light modulator, and configured to: calculate at least one kind of first parameter among an intensity amplitude, a phase shift amount, and an intensity average based on the first image data, obtain a deviation in relative positions of an optical axis of the lens and a reference coordinate of the modulation plane based on the first parameter, and control an origin position of the reference coordinate on the modulation plane so that the deviation in the relative positions is decreased.

Further, a control method for a spatial light modulator according to one aspect of the present invention includes a step of modulating light, by a spatial light modulator, based on a first modulation pattern; a step of outputting first modulated light for forming a first light spot and a second light spot on a pupil plane of a lens from the spatial light modulator; a step of capturing an image of a first fringe pattern image formed on a focal plane of the lens by the first modulated light on an imaging plane of an image sensor; a step of generating first image data indicating a light intensity distribution of the first fringe pattern image; a step of calculating at least one kind of first parameter among an intensity amplitude, a phase shift amount, and an intensity average from the first image data; a step of obtaining a deviation in relative positions of an optical axis of the lens and a reference coordinate of the modulation plane based on the first parameter; and a step of controlling an origin position of the reference coordinate on the modulation plane so that the deviation in relative positions is decreased.

With the apparatus and the method, at least two light spots are formed on a pupil plane of a lens by an SLM, whereby a fringe pattern image is formed on a focal plane of the lens. Here, inventors of the present invention have found that parameters (intensity amplitude, phase shift amount, and intensity average) included in this fringe pattern image vary according to a deviation in relative positions of a reference coordinate on a modulation plane of the SLM and an optical axis of the lens. Then, the inventors have realized that it is possible to know a deviation in relative positions by using such a phenomenon based on the parameters included in the fringe pattern image.

Thus, in the above apparatus and method, at least one kind of first parameter among an intensity amplitude, a phase shift amount, and an intensity average is calculated from image data related to the fringe pattern image and a deviation in the relative positions is obtained based on the first parameter. Accordingly, it is possible to easily and accurately detect a deviation in the relative positions. Then, in the above apparatus and method, an origin position of a reference coordinate of the SLM is changed in such a manner that the deviation in the relative positions is decreased, whereby it is possible to accurately make the relative positions match with each other.

According to a control apparatus and a control method for a spatial light modulator which are one aspect of the present invention, it is possible to accurately make relative positions of an optical axis of a lens and a reference coordinate axis of a modulation pattern presented on an SLM match with each other.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE EMBODIMENTS

An embodiment of a control apparatus and a control method for a spatial light modulator according to an aspect of the present invention will be described in detail below with reference to the attached drawings. In the description on the drawings, the same elements will be denoted with the same reference symbols, and overlapping description will be omitted.

First Embodiment

Figure 1:
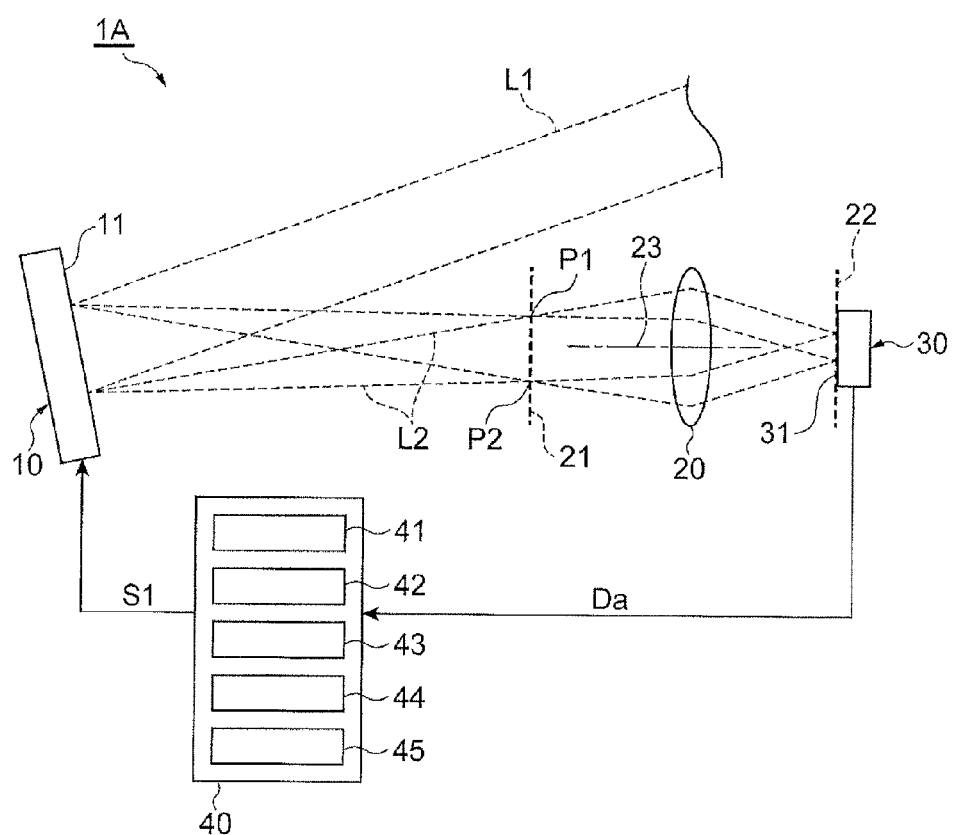
FIG. 1 is a view illustrating a configuration of a control apparatus according to an embodiment of the present invention.

FIG. 1 is a view illustrating a configuration of a control apparatus 1A according to an embodiment of the present invention. As illustrated in FIG. 1, the control apparatus 1A includes a spatial light modulator (SLM) 10, a lens 20, an imaging device (an image sensor) 30, and a control unit (a controller) 40.

The SLM 10 is, for example, a phase modulation type SLM or an intensity (amplitude) modulation type SLM, and includes a modulation plane 11 in which a plurality of modulation pixels are arranged two-dimensionally and which can present an arbitrary phase modulation pattern or an arbitrary intensity (amplitude) modulation pattern. The SLM 10 is optically coupled to a light source. The SLM 10 modulates modulation target light L1, which is output from a light source (such as laser light source), on the modulation plane 11 and outputs modulated light L2 (first modulated light).

As described later, the modulation plane 11 presents a first modulation pattern for forming a first light spot P1 and a second light spot P2 on a pupil plane 21 of the lens 20. Positions where the first light spot P1 and the second light spot P2 are formed on the pupil plane 21 are arbitrarily determined and are different from each other. The control unit 40 is electrically coupled to the SLM 10, and a signal S1 for presenting such a modulation pattern on the SLM 10 is provided from the control unit 40 to the SLM 10.

Figure 2:
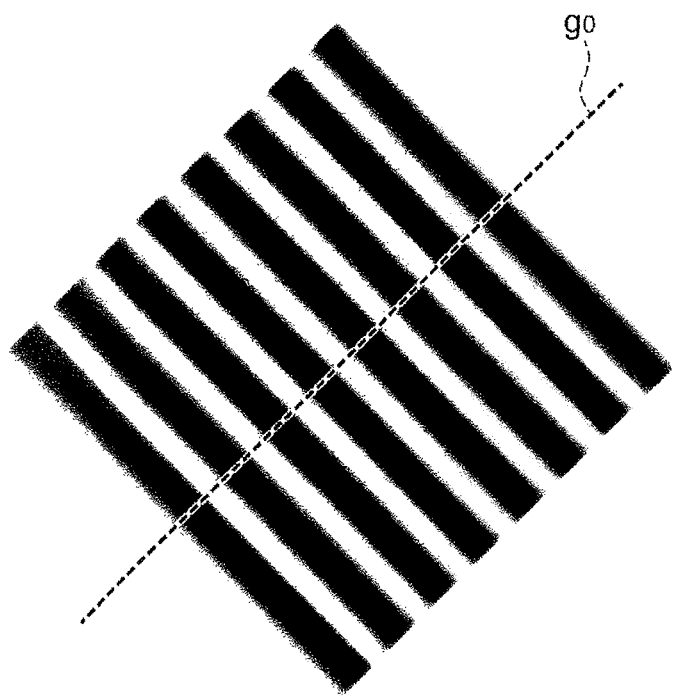
FIG. 2 is a view illustrating an example of a fringe pattern image formed on a focal plane.

The lens 20 is optically coupled to the SLM 10. The lens 20 is arranged on an optical axis between the modulation plane 11 and the imaging device 30. The lens 20 is, for example, a condensing lens used as an objective lens, and condenses the modulated light L2, which is output from the SLM 10, on a focal plane 22. Accordingly, the modulated light L2 of after the two light spots P1 and P2 are formed illuminate one region on the focal plane 22, and interferes and forms a fringe pattern image. FIG. 2 is a view illustrating an example of a fringe pattern image formed on the focal plane 22, and a part with high light intensity is illustrated in a light color and a part with low light intensity is illustrated in a dark color. Note that the lens 20 may include a plurality of lenses.

The imaging device 30 is optically coupled to the lens 20. The imaging device 30 includes an imaging plane 31 in which a plurality of photoelectric conversion pixels are arrayed two-dimensionally and which is arranged on the focal plane 22. The imaging device 30 includes, for example, an area image sensor such as a CCD area image sensor or a CMOS area image sensor. The imaging device 30 captures an image of a fringe pattern image, which is formed by the modulated light L2 on the focal plane 22, on the imaging plane 31. Accordingly, image data Da (first image data) indicating a light intensity distribution of the fringe pattern image is generated. The imaging device 30 is electrically coupled to the control unit 40, and provides the generated image data Da to the control unit 40.

The control unit 40 includes, for example, a computer including a processor and a memory, is electrically coupled to the SLM 10, and outputs the signal S1 indicating a modulation pattern to be presented on the SLM 10. The control unit 40 of the present embodiment includes a calculation unit (a calculator) 41, a storage unit (a storage) 42, an analysis unit (an analyzer) 43, a changing unit 44, and a creating unit 45. The control unit 40 realizes, by a processor, a function as the calculation unit 41, a function as the storage unit 42, a function as the analysis unit 43, a function as the changing unit 44, and a function as the creating unit 45. Note that in the control unit 40, each function may be realized with the same processor or functions may be realized with different processors. Further, a program for realizing each function with a processor is stored in a memory in a computer or in an external storage device which is electrically coupled to the computer.

Figure 3:
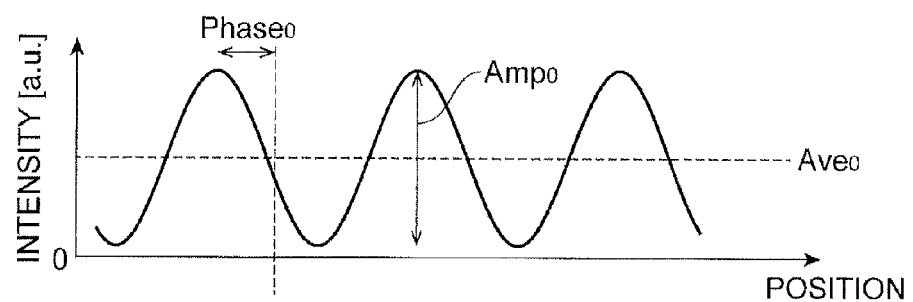
FIG. 3 is a graph illustrating an example of a light intensity variation along a dashed line in the fringe pattern image illustrated in FIG. 2.

The calculation unit 41 calculates, from the image data Da provided by the imaging device 30, at least one kind of parameter among an intensity amplitude of a fringe pattern image, a phase shift amount of the fringe pattern image, and an intensity average of the fringe pattern image. Here, FIG. 3 is a graph illustrating an example of a light intensity variation along a dashed line $g_0$ of the fringe pattern image illustrated in FIG. 2. In FIG. 3, a horizontal axis indicates a position on the focal plane 22 and a vertical axis indicates light intensity (arbitrary unit). As illustrated in FIG. 3, the light intensity variation in the fringe pattern image becomes sinusoidal. The intensity amplitude means $Amp_0$ in the drawing, that is, a difference between a maximal value and a minimal value of light intensity in an interference fringe. Further, the phase shift amount means $Phase_0$ in the drawing, that is, a deviation amount of a phase from a certain reference phase. Further, the intensity average means $Ave_0$ in the drawing, that is, an average value of light intensity in an interference fringe. The calculation unit 41 calculates at least one kind of parameter (first parameter) among these and provides the calculated parameter to the analysis unit 43.

Figure 21:
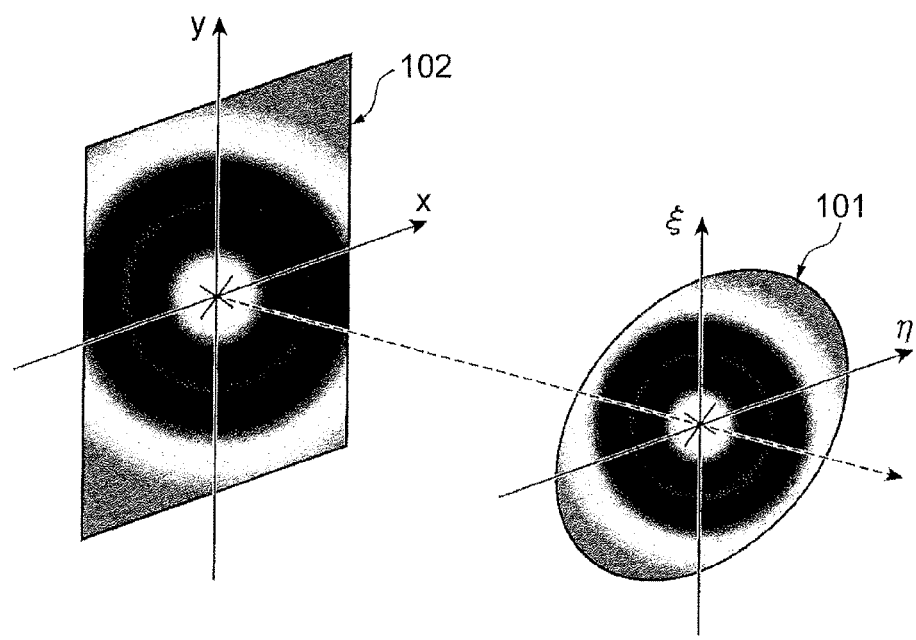
FIG. 21 is a view schematically illustrating a relative positional relationship between a pupil plane of a lens and a modulation plane of an SLM.

Based on the at least one kind of parameter, the analysis unit 43 obtains a magnitude and a direction of a deviation in relative positions of an optical axis 23 of the lens 20 and a reference coordinate of the modulation plane 11 (such as x-y coordinate system illustrated in FIG. 21). For example, the analysis unit 43 reads a data table from the storage unit 42. The storage unit 42 includes, for example, a non-volatile storage device, and stores a data table indicating a known correlation between a deviation in relative positions of the optical axis 23 of the lens 20 and the reference coordinate of the modulation plane 11 and the at least one kind of parameter. The storage unit 42 may be an external storage device which is electrically coupled to the control unit 40. The analysis unit 43 calculates a magnitude and a direction of the deviation in the relative positions by comparing the parameter provided by the calculation unit 41 with the data table.

The changing unit 44 controls and changes an origin position of the reference coordinate on the modulation plane 11 so that the deviation in the relative positions of the reference coordinate on the modulation plane 11 and the optical axis 23, which is acquired by the analysis unit 43, is decreased.

The creating unit 45 creates a modulation pattern to be presented on the SLM 10 with a new coordinate, which is based on the changed origin position, as a new reference. Alternatively, based on the new coordinate which is based on the changed origin position, the creating unit 45 modifies the signal S1 to present the modulation pattern on the SLM 10.

Figure 4:
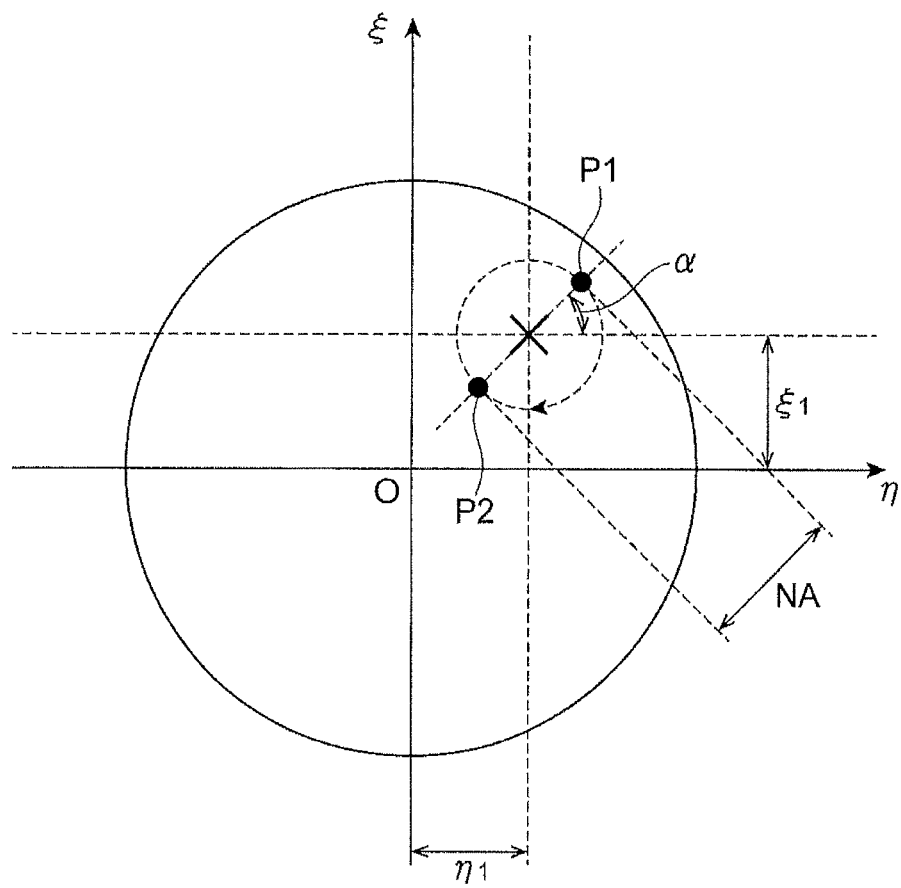
FIG. 4 is a view illustrating a relative positional relationship between a first light spot and a second light spot on a pupil plane and a relative positional relationship between these light spots and an $\eta$-$\xi$ orthogonal coordinate system defined on the pupil plane.

Here, a correlation between the deviation in the relative positions of the optical axis 23 of the lens 20 and the reference coordinate of the modulation plane 11 and an intensity amplitude of a fringe pattern image, a phase shift amount of the fringe pattern image, and an intensity average of the fringe pattern image will be described. FIG. 4 is a view illustrating a relative positional relationship between a first light spot P1 and a second light spot P2 on the pupil plane 21 and a relative positional relationship between these light spots P1 and P2 and an η-ξ orthogonal coordinate system defined on the pupil plane 21. Here, it is assumed that a distance between the light spot P1 and the light spot P2 is NA and that a coordinate of a middle position between the light spot P1 and the light spot P2 is $(\eta_1, \xi_1)$. Further, it is assumed that an angle of a straight line, which connects the light spot P1 and the light spot P2, to an η-axis is α.

These light spots P1 and P2 form a fringe pattern image (see FIG. 2) due to interference on the focal plane 22 of the lens 20. As expressed by the following expression (1), an electric field intensity It at a certain position in the fringe pattern image can be expressed by component decomposition into an x component Ex, a y component Ey, and a z component Ez. Note that x, y, and z are coordinates on the focal plane 22 of the lens 20 and z is in parallel with an optical axis direction.

$$It=|Ex|^2+|Ey|^2+|Ez|^2 \quad (1)$$

This expression (1) indicates that a final interference fringe pattern image is generated by the sum of three light intensity distributions respectively formed by the x component Ex, the y component Ey, and the z component Ez. Then, a relative phase difference or an intensity amplitude of the interference fringe pattern image formed by the x component Ex, the y component Ey, and the z component Ez varies depending on a polarization direction, an angle α, and a distance NA of the modulated light L2 input into the pupil plane 21. Thus, a phase shift amount, an intensity amplitude, and an intensity average of the electric field intensity It expressed by the sum of the x component Ex, the y component Ey, and the z component Ez also vary depending on a polarization direction, an angle α, and a distance NA of the light spots P1 and P2.

That is, when a distribution of the electric field intensity It (interference fringe pattern image) is analyzed as a function of the angle α, not only a simple rotation of the fringe pattern image but also a variation in a phase shift amount, an intensity amplitude, and an intensity average are generated according to the angle α and the distance NA of the light spots P1 and P2. Note that NA generally means a numerical aperture, however, NA can be treated as an index that can be converted into a distance [mm]. In the following description, NA (numerical aperture) is also treated as the distance NA.

Here, an example of a correlation between the coordinate $(\eta_1, \xi_1)$ of the middle position of the light spot P1 and the light spot P2 and the angle α, and the phase shift amount, the intensity amplitude, and the intensity average will be described. Note that the correlation described in the following is calculated on the assumption that an optical system which uses an oil immersion objective lens as the lens 20 and which includes, as the focal plane 22, a boundary surface of a medium with a refractive index 1.515 and a medium with a refractive index 1.0 is used. Here, it is assumed that a depolarization effect and an intensity loss due to the lens 20 are not generated.

Figure 5A:
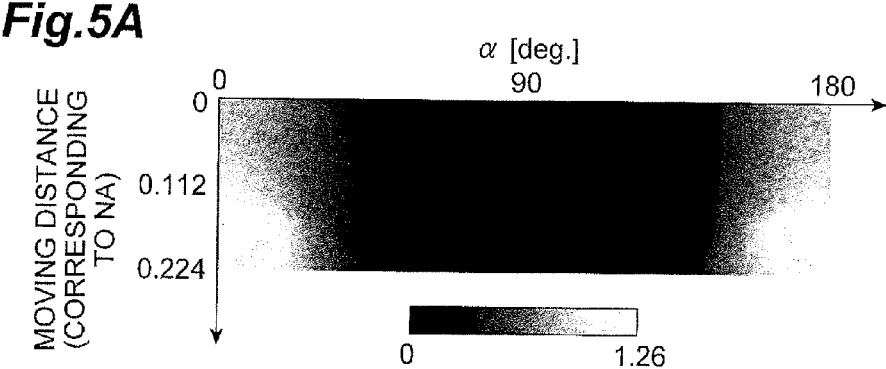
FIG. 5A to FIG. 5C are graphs illustrating variations in (A) intensity amplitude, (B) intensity average, and (C) phase shift amount, in a case where a coordinate $\xi_1$ is fixed to zero and an angle $\alpha$ and a coordinate $\eta_1$ are varied.
Figure 5B:
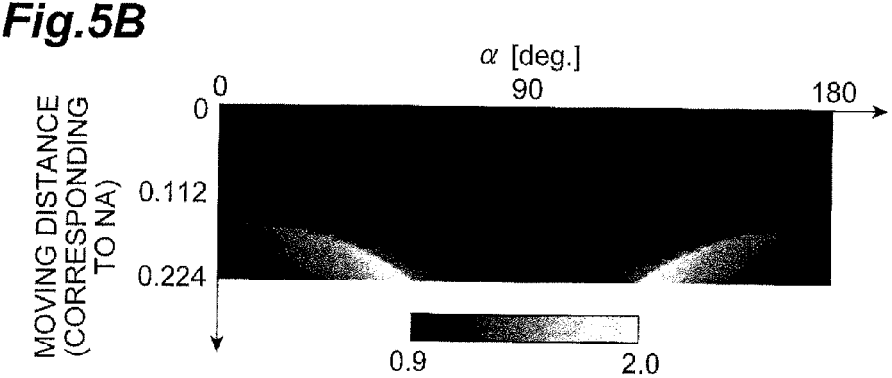
Figure 5C:
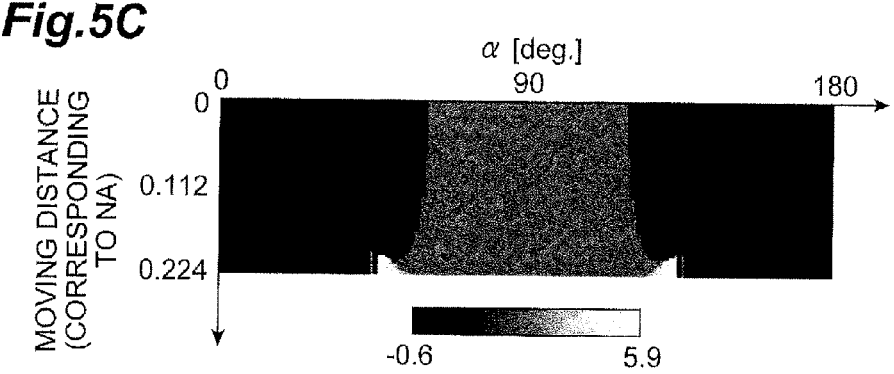
Figure 6A:
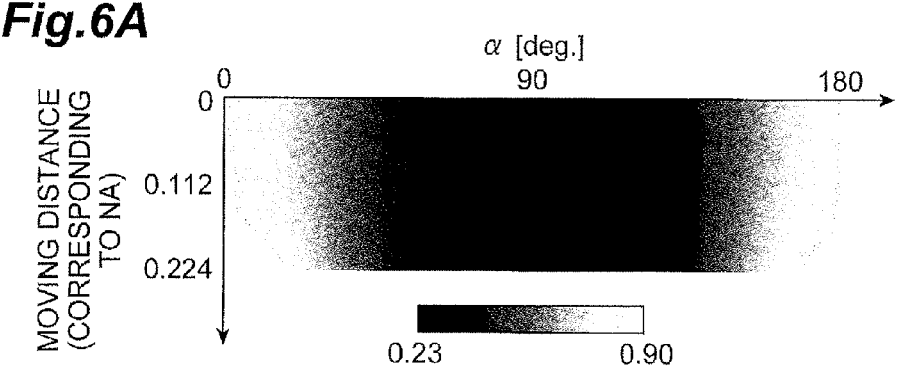
FIG. 6A to FIG. 6C are graphs illustrating variations in (A) intensity amplitude, (B) intensity average, and (C) phase shift amount, in a case where a coordinate $\xi_1$ is fixed to zero and an angle $\alpha$ and a coordinate $\eta_1$ are varied.
Figure 6B:
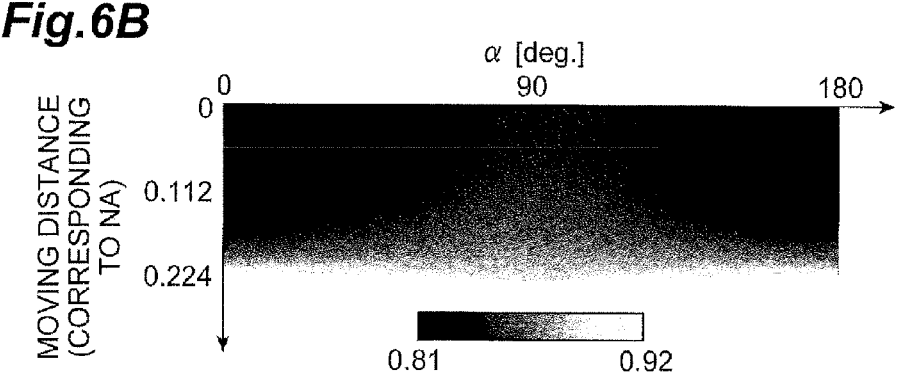
Figure 6C:
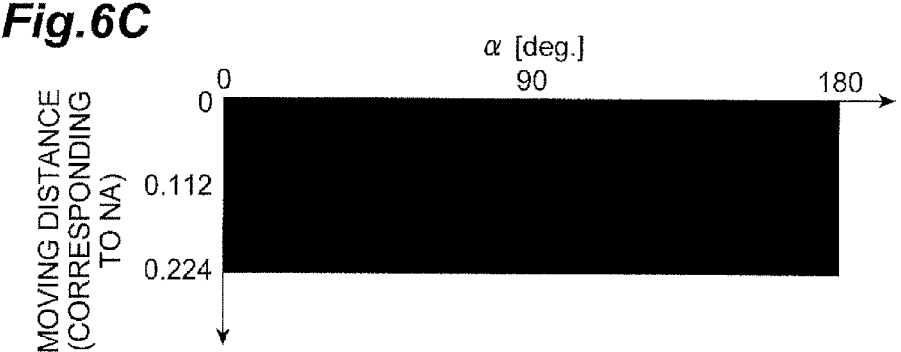

FIG. 5A to FIG. 5C and FIG. 6A to FIG. 6C are graphs illustrating variations in (A) intensity amplitude, (B) intensity average, and (C) phase shift amount, in a case where a coordinate $\xi_1$ is fixed to zero (that is, middle of the light spots P1 and P2 is on η-axis) and an angle α and a coordinate $\eta_1$ are varied. FIG. 5A to FIG. 5C are graphs illustrating a case where the distance NA is 0.8 and FIG. 6A to FIG. 6C are graphs illustrating a case where the distance NA is 0.6. In these drawings, values of the intensity amplitude, the intensity average, and the phase shift amount are expressed by thickness of a color, and a smaller value is expressed in a darker color and a larger value is expressed in a lighter color. Further, in these drawings, a vertical axis indicates a variation amount (moving distance corresponding to NA) of the coordinate $\eta_1$ and the horizontal axis indicates the angle α.

With reference to FIG. 5A to FIG. 5C and FIG. 6A to FIG. 6C, it is understood that all of the intensity amplitude, the intensity average, and the phase shift amount of the fringe pattern image vary according to variations of the angle α and the coordinate $\eta_1$. Specifically, in FIG. 5A to FIG. 5C with the large distance NA, the variations are significant compared to FIG. 6A to FIG. 6C with the small distance NA. From these correlations, when at least one value among the intensity amplitude, the intensity average, and the phase shift amount of the fringe pattern image indicated by the image data Da is determined, the coordinate $\eta_1$ can be identified.

Figure 7A:
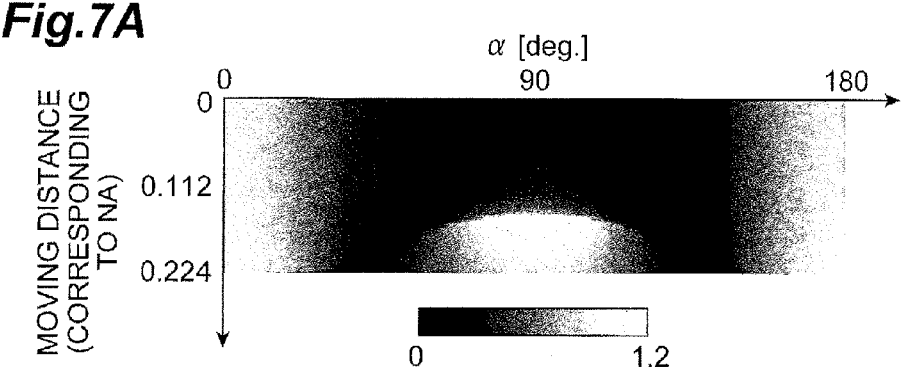
FIG. 7A to FIG. 7C are graphs illustrating variations in (A) intensity amplitude, (B) intensity average, and (C) phase shift amount, in a case where a coordinate $\eta_1$ is fixed to zero and an angle $\alpha$ and a coordinate $\xi_1$ are varied.
Figure 7B:
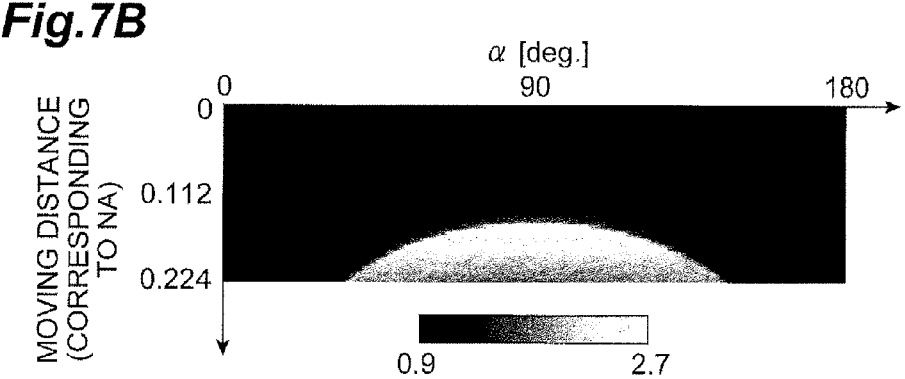
Figure 7C:
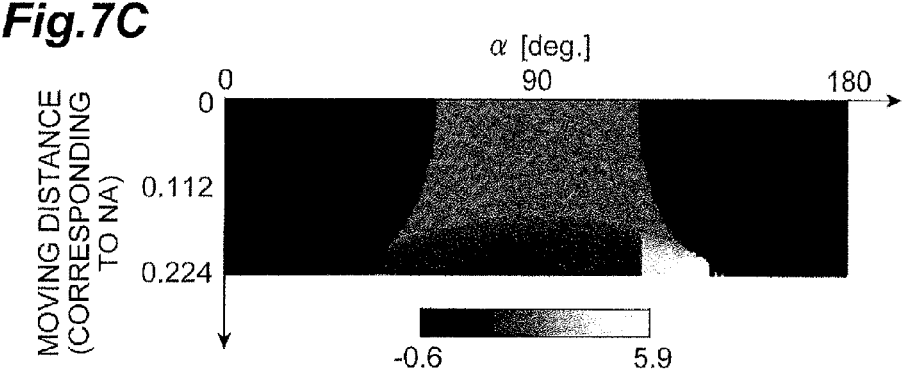
Figure 8A:
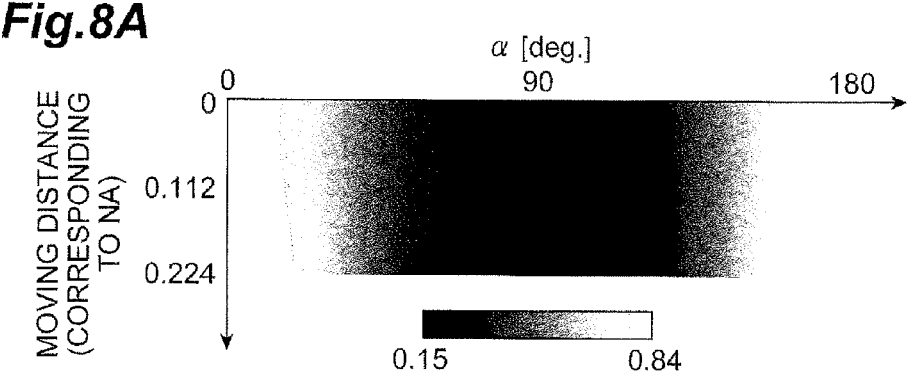
FIG. 8A to FIG. 8C are graphs illustrating variations in (A) intensity amplitude, (B) intensity average, and (C) phase shift amount, in a case where a coordinate $\eta_1$ is fixed to zero and an angle $\alpha$ and a coordinate $\xi_1$ are varied.
Figure 8B:
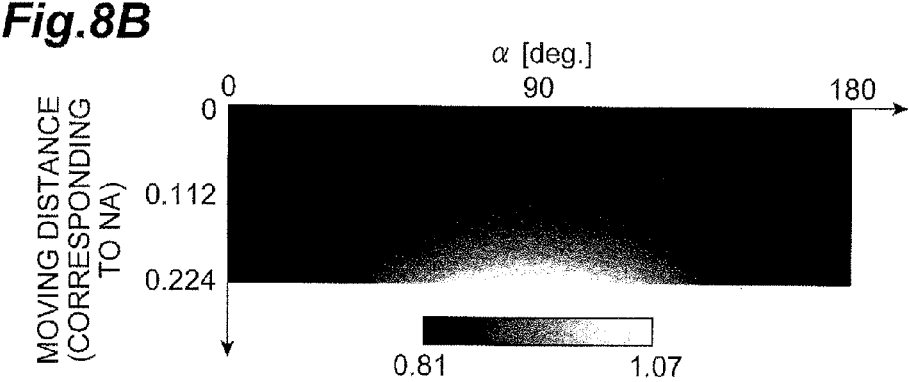
Figure 8C:
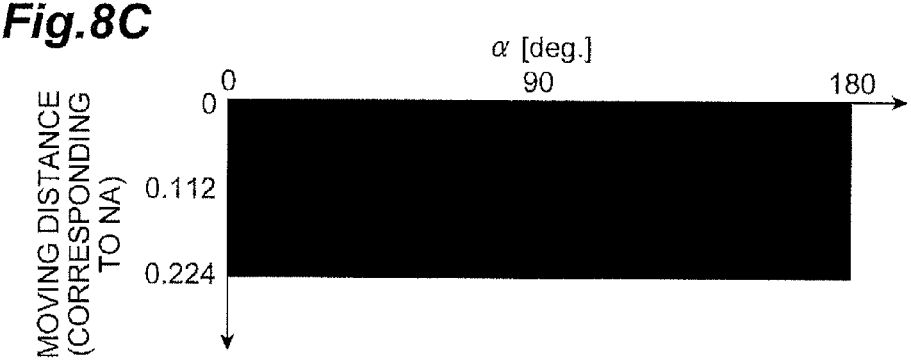

FIG. 7A to FIG. 7C and FIG. 8A to FIG. 8C are graphs illustrating variations in (A) intensity amplitude, (B) intensity average, and (C) phase shift amount, in a case where a coordinate $\eta_1$ is fixed to zero (that is, middle of the light spots P1 and P2 is on ξ-axis) and an angle α and a coordinate $\xi_1$ are varied. FIG. 7A to FIG. 7C are graphs illustrating a case where the distance NA is 0.8 and FIG. 8A to FIG. 8C are graphs illustrating a case where the distance NA is 0.6. In these drawings, values of the intensity amplitude, the intensity average, and the phase shift amount are also expressed by thickness of a color, and a smaller value is expressed in a darker color and a larger value is expressed in a lighter color. Further, in these drawings, a vertical axis indicates a variation amount (moving distance) of the coordinate $\xi_1$ and the horizontal axis indicates the angle α.

With reference to FIG. 7A to FIG. 7C and FIG. 8A to FIG. 8C, it is understood that all of the intensity amplitude, the intensity average, and the phase shift amount of the fringe pattern image vary according to variations of the angle α and the coordinate $\xi_1$. Specifically, in FIG. 7A to FIG. 7C with the large distance NA, the variations are significant compared to FIG. 8A to FIG. 8C with the small distance NA. From these correlations, when at least one value among the intensity amplitude, the intensity average, and the phase shift amount of the fringe pattern image indicated by the image data Da is determined, the coordinate $\xi_1$ can be identified.

Figure 9A:
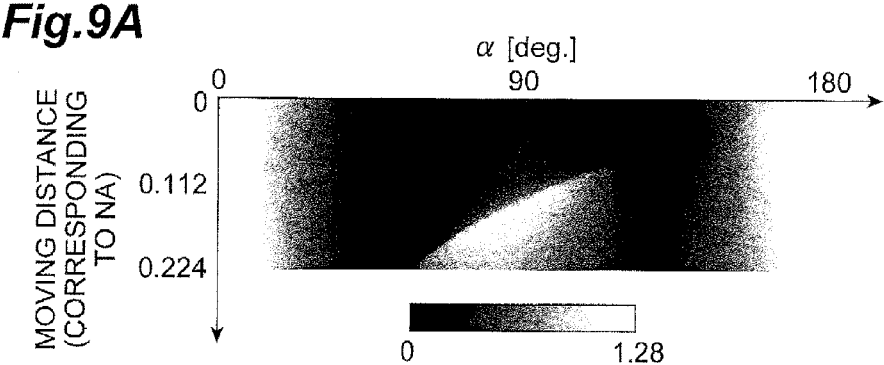
FIG. 9A to FIG. 9C are graphs illustrating variations in (A) intensity amplitude, (B) intensity average, and (C) phase shift amount, in a case where a coordinate $\eta_1$ is fixed to 0.149 and an angle $\alpha$ and a coordinate $\xi_1$ are varied.
Figure 9B:
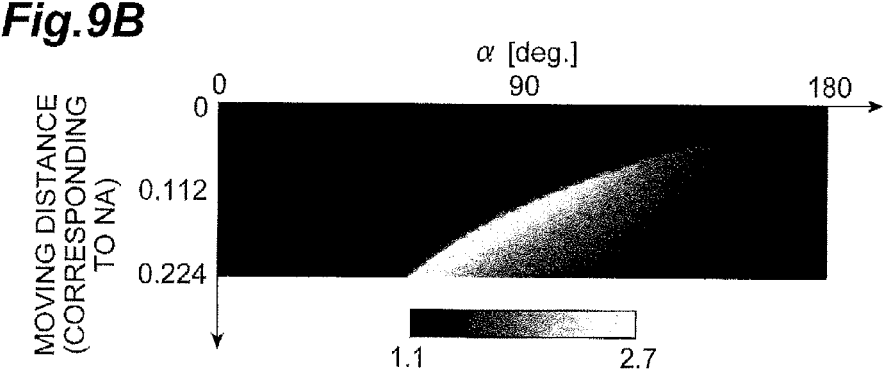
Figure 9C:
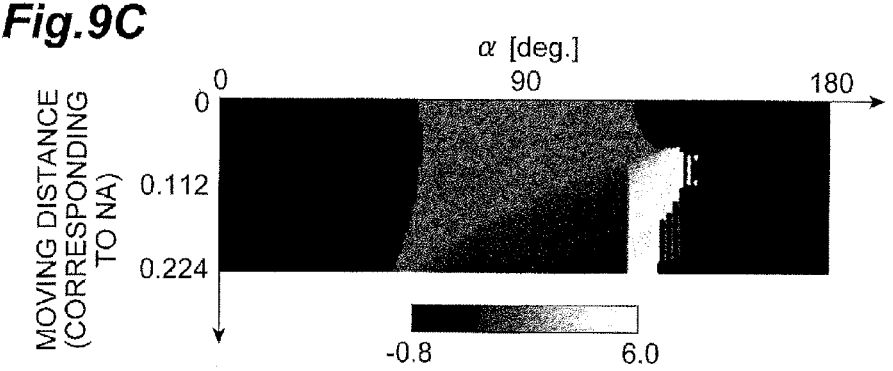
Figure 10A:
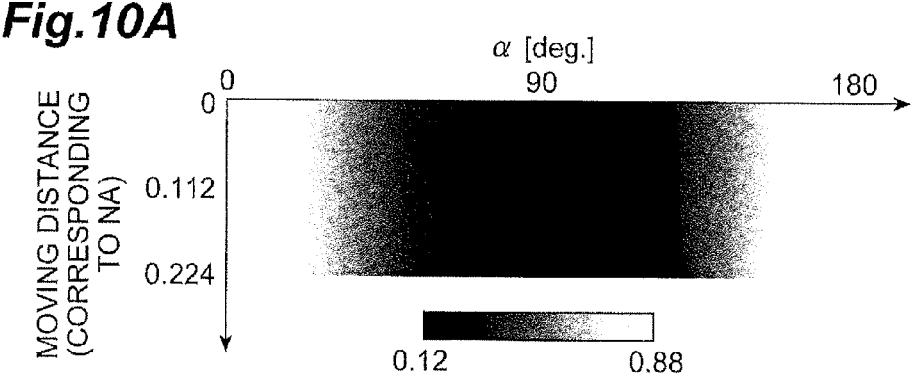
FIG. 10A to FIG. 10C are graphs illustrating variations in (A) intensity amplitude, (B) intensity average, and (C) phase shift amount, in a case where a coordinate $\eta_1$ is fixed to 0.149 and an angle $\alpha$ and a coordinate $\xi_1$ are varied.
Figure 10B:
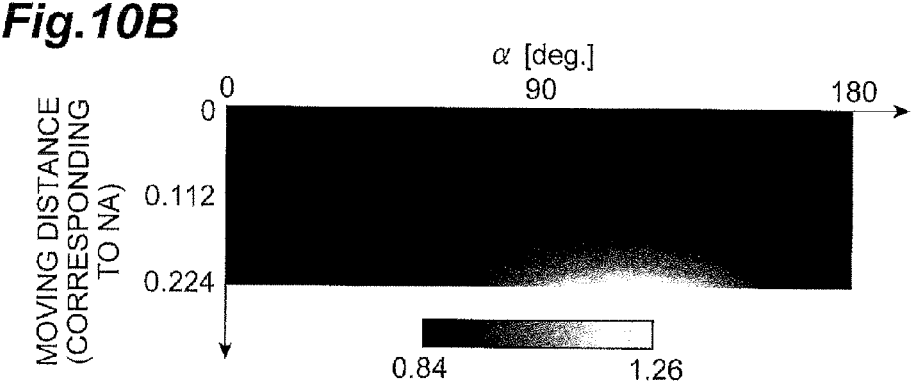
Figure 10C:
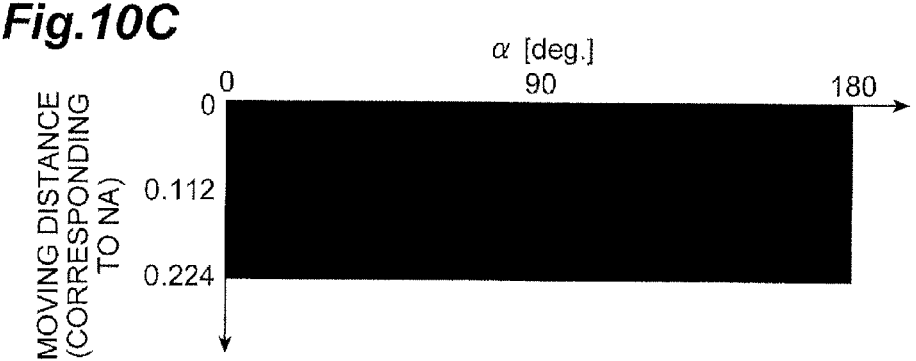

FIG. 9A to FIG. 9C and FIG. 10A to FIG. 10C are graphs illustrating variations in (A) intensity amplitude, (B) intensity average, and (C) phase shift amount, in a case where a coordinate $\eta_1$ is fixed to 0.149 (that is, middle of the light spots P1 and P2 is not on η-axis and ξ-axis) and an angle α and a coordinate $\xi_1$ are varied. FIG. 9A to FIG. 9C are graphs illustrating a case where the distance NA is 0.8 and FIG. 10A to FIG. 10C are graphs illustrating a case where the distance NA is 0.6. In these drawings, values of the intensity amplitude, the intensity average, and the phase shift amount are also expressed by thickness of a color, and a smaller value is expressed in a darker color and a larger value is expressed in a lighter color. Further, in these drawings, a vertical axis indicates a variation amount (moving distance) of the coordinate $\xi_1$ and the horizontal axis indicates the angle α.

With reference to FIG. 9A to FIG. 9C and FIG. 10A to FIG. 10C, it is understood that all of the intensity amplitude, the intensity average, and the phase shift amount of the fringe pattern image vary according to variations of the angle α and the coordinate $\xi_1$. Specifically, in FIG. 9A to FIG. 9C with the large distance NA, the variations are significant compared to FIG. 10A to FIG. 10C with the small distance NA. From these correlations, when at least one value among the intensity amplitude, the intensity average, and the phase shift amount of the fringe pattern image indicated by the image data Da is determined, the coordinate $\xi_1$ can be identified. Note that with a similar principle, it is possible to identify a coordinate $\eta_1$ by using a correlation acquired in a case where the coordinate $\xi_1$ is fixed to an arbitrary value and the angle α and the coordinate $\eta_1$ are varied.

Figure 11:
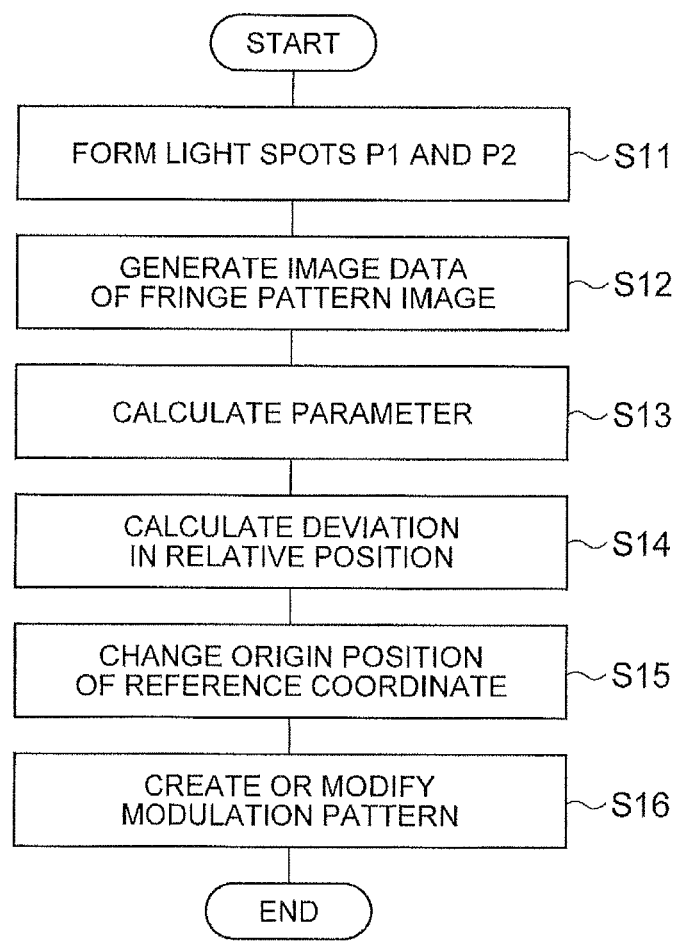
FIG. 11 is a flowchart illustrating an operation of a control apparatus and each step included in a control method.

A control method for the spatial light modulator will be described along with an operation of the control apparatus 1A according to the present embodiment. FIG. 11 is a flowchart illustrating an operation of the control apparatus 1A and each step included in the control method.

First, for forming the light spots P1 and P2 on the pupil plane 21 of the lens 20, the SLM 10 presents a modulation pattern on the modulation plane 11, modulates the modulation target light L1 on the modulation plane 11, and outputs the modulated light L2 (step S11). Accordingly, on the focal plane 22 of the lens 20, a fringe pattern image illustrated in FIG. 2 is formed. Next, the imaging device 30 images this fringe pattern image (first fringe pattern image) and generates image data Da indicating a light intensity distribution of the fringe pattern image (step S12). Then, the calculation unit 41 calculates, from the image data Da, at least one kind of parameter (first parameter) among the intensity amplitude, the phase shift amount, and the intensity average of the fringe pattern image (step S13).

Then, the analysis unit 43 calculates a deviation in relative positions of the optical axis 23 of the lens 20 and a reference coordinate (such as x-y coordinate system illustrated in FIG. 21) of the modulation plane 11 (step S14). Here, the analysis unit 43 calculates the deviation in the relative positions of the optical axis 23 and the reference coordinate based on the calculated parameter. Further, here, the analysis unit 43 may calculate the deviation in the relative positions of the optical axis 23 and the reference coordinate by comparing the at least one kind of parameter calculated in step S13 with the data table stored in the storage unit 42 and indicating a known correlation.

Then, the changing unit 44 changes an origin position of the reference coordinate on the modulation plane 11 so that the deviation in relative positions calculated in step S14 is decreased (step S15). Moreover, the creating unit 45 creates a modulation pattern to be presented on the SLM 10 based on the origin position of the reference coordinate, which is changed in step S15, or modifies the signal S1 for presenting a modulation pattern on the SLM 10 based on a new coordinate which is based on the changed origin position (step S16).

An effect acquired by the control method and the control apparatus 1A for the SLM according to the above-described present embodiment will be described.

In the present embodiment, at least two light spots P1 and P2 are formed on the pupil plane of the lens 20 by the SLM 10, whereby a fringe pattern image is formed on the focal plane 22 of the lens 20. Here, the inventors have found that parameters (intensity amplitude, phase shift amount, and intensity average) included in this fringe pattern image vary according to a deviation in relative positions of a reference coordinate on the modulation plane 11 of the SLM 10 and the optical axis 23 of the lens 20. Then, the inventors have realized that it is possible to know a deviation in relative positions by using such a phenomenon and based on the parameters included in the fringe pattern image.

Thus, in the present embodiment, at least one kind of parameter among the intensity amplitude, the phase shift amount, and the intensity average is calculated from the image data Da for the fringe pattern image, and a deviation in relative positions is obtained based on a correlation with the parameter. Accordingly, it is possible to easily and accurately detect a deviation in the relative positions. Then, as in the present embodiment, an origin position of the reference coordinate of the SLM 10 is changed so that the deviation in the relative positions is decreased, whereby it is possible to accurately make the relative positions match with each other.

Further, as in the present embodiment, the control apparatus 1A may include the storage unit 42 that stores a data table indicating the known correlation, and the analysis unit 43 may compare the at least one kind of parameter calculated by the calculation unit 41 with the data table for calculating a deviation in the relative positions. Similarly, in step S14, for calculating a deviation in the relative positions, the at least one kind of parameter calculated in step S13 may be compared with the data table that is stored in the storage unit 42 and that indicates the known correlation. Accordingly, it becomes possible to accurately perform comparison of a correlation with a parameter, and thus, it is possible to detect a deviation in relative positions more accurately.

First Modification Example

In the above embodiment, the first light spot P1 and the second light spot P2 are formed on the pupil plane 21 of the lens 20, a parameter (first parameter) is calculated from the image data Da of the acquired fringe pattern image, and a deviation in relative positions is obtained. In the present modification example, before or after this, a third light spot and a fourth light spot are formed on the pupil plane 21, a parameter (second parameter) is calculated from image data Db (second image data) of an acquired fringe pattern image, and a deviation in relative positions is obtained based on the second parameter and the first parameter.

Figure 12:
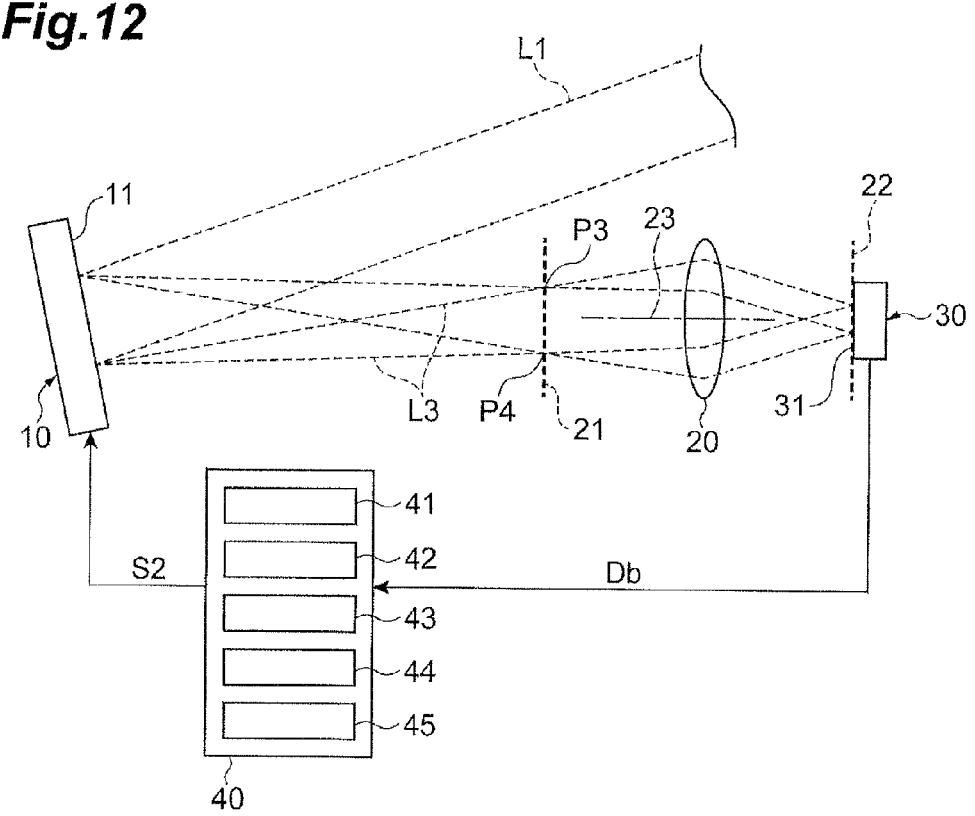
FIG. 12 is a view illustrating a configuration of a control apparatus according to a first modification example.
Figure 13A:
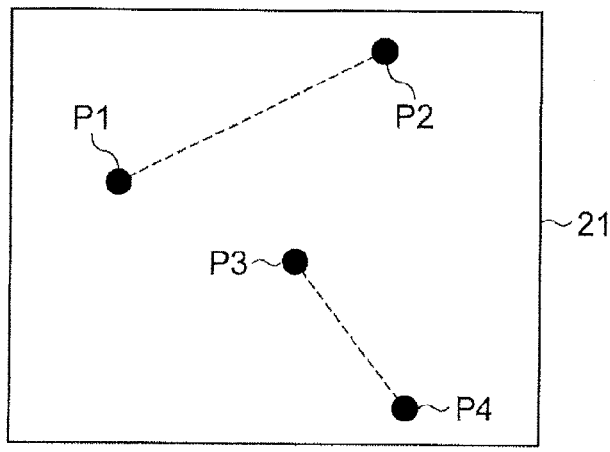
FIG. 13A to FIG. 13C are views illustrating examples of positions where light spots are formed.
Figure 13B:
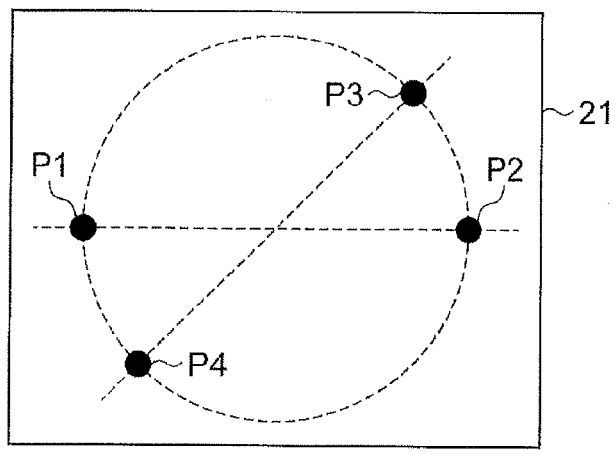
Figure 13C:
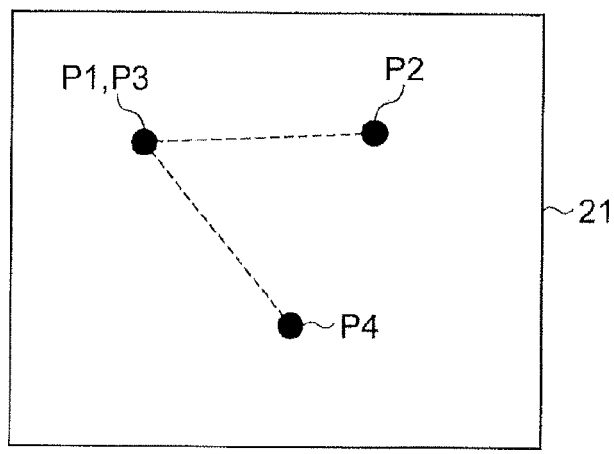

More specifically, as illustrated in FIG. 12, an SLM 10 of the present modification example presents a different modulation pattern (second modulation pattern) on a modulation plane 11 and further outputs modulated light L3 (second modulated light) for forming a third light spot P3 and a fourth light spot P4. Here, FIG. 13A to FIG. 13C are views illustrating examples of positions where the light spots P3 and P4 are formed. Although light spots P1 and P2 are also illustrated in FIG. 13A to FIG. 13C in order to make it easy to understand, the light spots P1 and P2 and the light spots P3 and P4 are not formed simultaneously.

As illustrated in FIG. 13A, the light spots P3 and P4 may be formed on positions completely different from those of the light spots P1 and P2. Further, as illustrated in FIG. 13B, the light spots P3 and P4 may be formed in such a manner that a midpoint thereof becomes identical to a midpoint of the light spots P1 and P2. Note that in the example illustrated in FIG. 13B, the light spots P1 to P4 are positioned on a common circle. Alternatively, as illustrated in FIG. 13C, a position where one of the light spots P3 and P4 is formed may be identical to a position where one of the light spots P1 and P2 is formed.

An imaging device 30 of the present modification example captures an image of a fringe pattern image (second fringe pattern image) formed on a focal plane 22 of a lens 20 by modulated light L3 and further generates image data Db indicating a light intensity distribution of the fringe pattern image. The imaging device 30 provides the generated image data Db to a control unit 40. In the control unit 40, from the image data Db provided by the imaging device 30, a calculation unit 41 calculates at least one kind of parameter (second parameter) among an intensity amplitude, a phase shift amount, and an intensity average of the fringe pattern image. The calculation unit 41 provides the calculated parameter to an analysis unit 43.

The analysis unit 43 obtains a magnitude and a direction of a deviation in relative positions of a reference coordinate of the modulation plane 11 and an optical axis 23 based on the two parameters provided from the calculation unit 41, that is, the first parameter calculated from the image data Da and the second parameter calculated from the image data Db. For example, the analysis unit 43 calculates a magnitude and a direction of a deviation in relative positions by reading a data table from a storage unit 42 and comparing each of the parameters with the data table.

The changing unit 44 changes an origin position of the reference coordinate on the modulation plane 11 so that the deviation in the relative positions of the reference coordinate on the modulation plane 11 and the optical axis 23, which is acquired by the analysis unit 43, is decreased.

The creating unit 45 creates a modulation pattern to be presented on the SLM 10 with a new coordinate, which is based on the changed origin position, as a new reference. Alternatively, based on the new coordinate which is based on the changed origin position, the creating unit 45 modifies the signal S2 to present the modulation pattern on the SLM 10.

Figure 14:
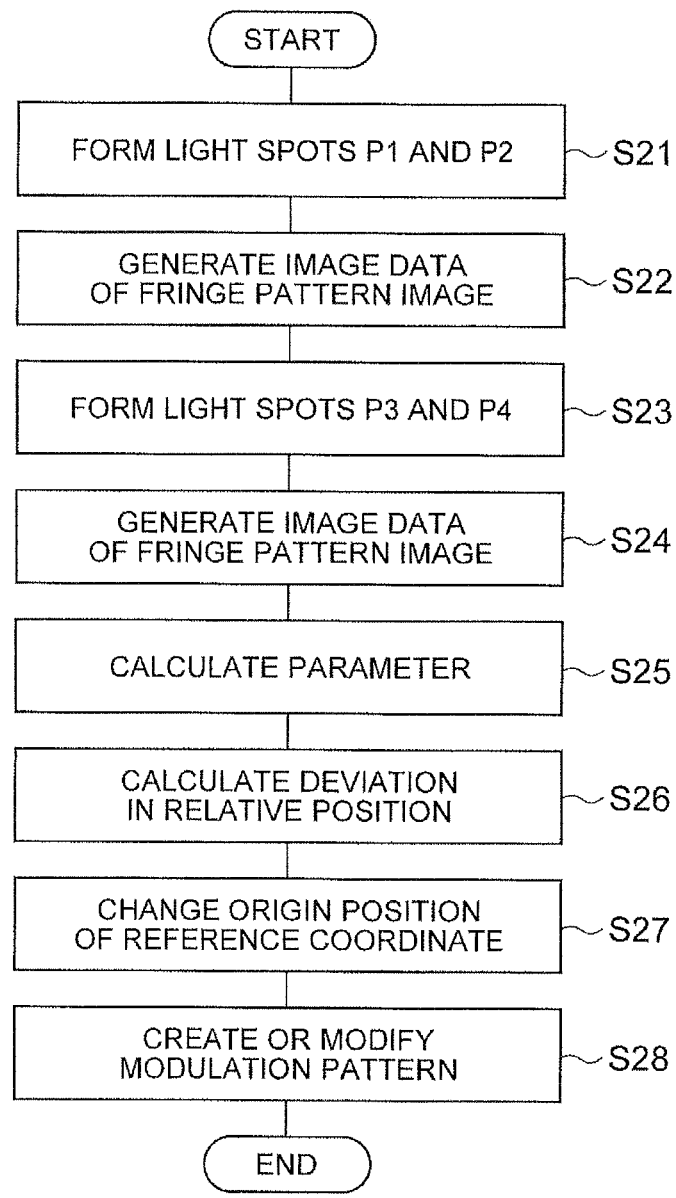
FIG. 14 is a flowchart illustrating an operation of the control apparatus according to the first modification example and each step included in a control method according to the first modification example.

An operation of the control apparatus according to the present modification example and a control method according to the present modification example will be described together. FIG. 14 is a flowchart illustrating an operation of the control apparatus according to the present modification example and each step included in the control method according to the present modification example.

Figure 15A:
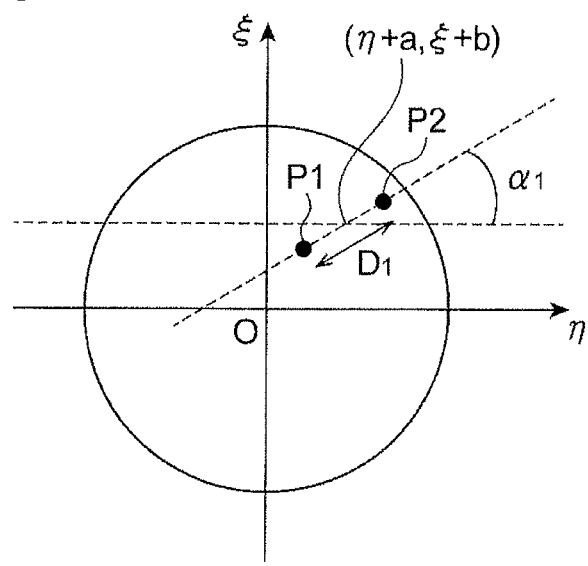
FIG. 15A and FIG. 15B are (A) a view illustrating positions of light spots in an $\eta$-$\xi$ orthogonal coordinate system on a pupil plane, and (B) a view illustrating a fringe pattern image formed on a focal plane.
Figure 15B:
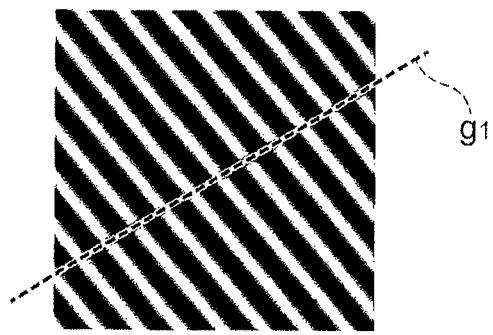

In the present modification example, first, the SLM 10 presents a modulation pattern on the modulation plane 11 and outputs modulated light L2 for forming the light spots P1 and P2 on the pupil plane 21 (step S21). FIG. 15A is a view illustrating positions of the light spots P1 and P2 in an $\eta$-$\xi$ orthogonal coordinate system on the pupil plane 21. Here, it is assumed that a distance between the light spot P1 and the light spot P2 is NA=$D_1$, and that a coordinate of a middle position between the light spot P1 and the light spot P2 is ($\eta$+a, $\xi$+b). Further, it is assumed that an angle of a straight line, which connects the light spot P1 and the light spot P2, to an $\eta$-axis is $\alpha_1$. Accordingly, on the focal plane 22, a fringe pattern image (first fringe pattern image) illustrated in FIG. 15B is formed. The imaging device 30 images this fringe pattern image and generates image data Da indicating a light intensity distribution of the fringe pattern image (step S22). Note that a light intensity distribution $f_{k=1}$ of the fringe pattern image is expressed by the following function (2) of $\eta$+a, $\xi$+b, $D_1$, and $\alpha_1$.

$$f_{k=1}(\eta+a,\xi+b,D_1,\alpha_1) \qquad (2)$$

Figure 16A:
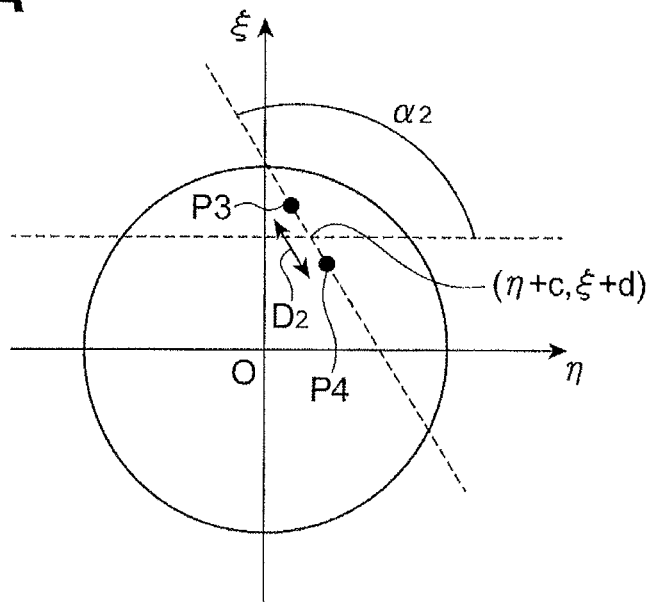
FIG. 16A and FIG. 16B are (A) a view illustrating positions of light spots in an $\eta$-$\xi$ orthogonal coordinate system on a pupil plane, and (B) a view illustrating a fringe pattern image formed on a focal plane.
Figure 16B:
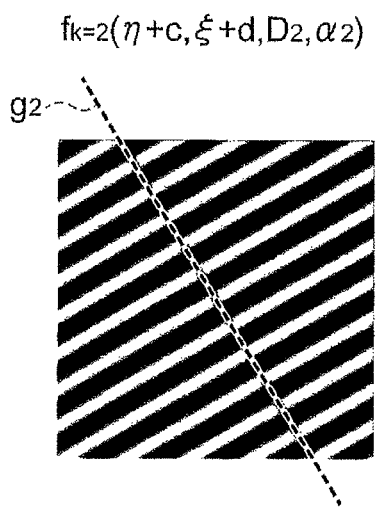

Next, the SLM 10 presents a modulation pattern on the modulation plane 11 and outputs modulated light L3 for forming the light spots P3 and P4 on the pupil plane 21 (step S23). FIG. 16A is a view illustrating positions of the light spots P3 and P4 in the $\eta$-$\xi$ orthogonal coordinate system on the pupil plane 21. Here, it is assumed that a distance between the light spot P3 and the light spot P4 is NA=$D_2$ and that a coordinate of a middle position between the light spot P3 and the light spot P4 is ($\eta$+c, $\xi$+d). Further, it is assumed that an angle of a straight line, which connects the light spot P3 and the light spot P4, to the $\eta$-axis is $\alpha_2$. Accordingly, on the focal plane 22, a fringe pattern image (second fringe pattern image) illustrated in FIG. 16B is fainted. The imaging device 30 images this fringe pattern image and generates image data Db indicating a light intensity distribution of the fringe pattern image (step S24). Note that a light intensity distribution $f_{k=2}$ of the fringe pattern image is expressed by the following function (3) of $\eta$+c, $\xi$+d, $D_2$, and $\alpha_2$.

$$f_{k=2}(\eta+c,\xi+d,D_2,\alpha_2) \qquad (3)$$

Figure 17A:
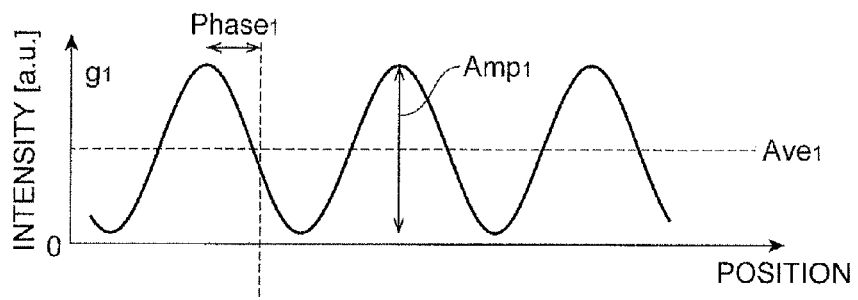
FIG. 17A and FIG. 17B are (A) a graph illustrating an example of a light intensity variation along a dashed line in the fringe pattern image illustrated in FIG. 15B, and (B) a graph illustrating an example of a light intensity variation along a dashed line in the fringe pattern image illustrated in FIG. 16B.
Figure 17B:
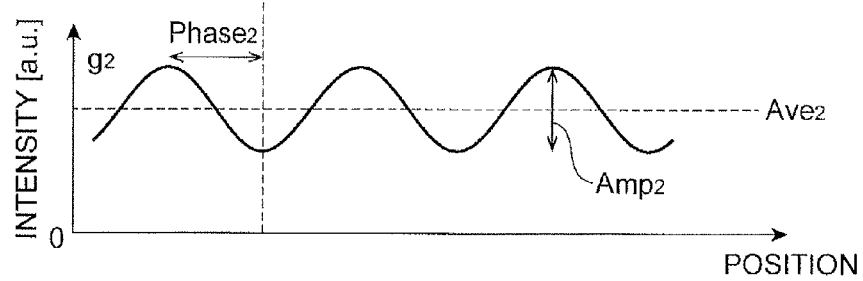

Then, the calculation unit 41 calculates at least one kind of parameter (first parameter and second parameter) among an intensity amplitude, a phase shift amount, and an intensity average of the fringe pattern image for each of the image data Da and the image data Db (step S25). FIG. 17A is a graph illustrating an example of a light intensity variation along a dashed line $g_1$ in the fringe pattern image illustrated in FIG. 15B. FIG. 17B is a graph illustrating an example of a light intensity variation along a dashed line $g_2$ in the fringe pattern image illustrated in FIG. 16B. In each of these drawings, a horizontal axis indicates a position on the focal plane 22 and a vertical axis indicates light intensity (arbi-trary unit). In step S25, the calculation unit 41 calculates at least one kind of parameter among an intensity amplitude ($Amp_1$, $Amp_2$), a phase shift amount ($Phase_1$, $Phase_2$), and an intensity average ($Ave_1$, $Ave_2$) and provides the calculated parameter to the analysis unit 43.

Then, the analysis unit 43 calculates a deviation in relative positions of the optical axis 23 of the lens 20 and the reference coordinate of the modulation plane 11 (step S26). Here, based on each parameter calculated in step S25, a deviation in the relative positions of the optical axis 23 and the reference coordinate is calculated. Further, here, the analysis unit 43 may calculate the deviation in the relative positions by comparing each parameter calculated in step S25 with the data table stored in the storage unit 42 and indicating a known correlation.

The analysis unit 43 of the present modification example calculates an initial position ($\eta$, $\xi$) based on two fringe pattern images. In the above functions (2) and (3), variables a, b, c, d, $D_1$, $D_2$, $\alpha_1$, and $\alpha_2$ can be arbitrarily determined, thus, when there are at least two fringe pattern images, an initial position ($\eta$, $\xi$) can be obtained. That is, by a comparison between at least one kind of parameter among the intensity amplitude ($Amp_1$, $Amp_2$), the phase shift amount ($Phase_1$, $Phase_2$), and the intensity average ($Ave_1$, $Ave_2$) illustrated in FIG. 17A and FIG. 17B and a data table, the initial position ($\eta$, $\xi$) is determined uniquely, thus, it is possible to obtain a deviation in the relative positions.

Then, an origin position of the reference coordinate on the modulation plane 11 is changed so that the deviation in the relative positions obtained in step S26 is decreased (step S27). Moreover, the creating unit 45 creates a modulation pattern to be presented on the SLM 10 based on the origin position of the reference coordinate, which is changed in step S27, or modifies a signal S1 to present a modulation pattern on the SLM 10 based on the new coordinate which is based on the changed origin position (step S28).

According to the above-described present modification example, based on parameters of two different fringe pattern images (that is, parameter (first parameter) of fringe pattern image (first fringe pattern image) formed by the light spots P1 and P2 and parameter (second parameter) of fringe pattern image (second fringe pattern image) formed by the light spots P3 and P4), a deviation in the relative positions of the reference coordinate of the modulation plane 11 and the optical axis 23 is obtained. Accordingly, it is possible to detect a deviation in the relative positions more accurately compared to the above embodiment.

Further, as in the present modification example, the analysis unit 43 (step S26) may compare each parameter calculated from the image data Da, Db with the data table for calculating a deviation in relative positions. Accordingly, it becomes possible to accurately perform comparison of a correlation with parameters of two different fringe pattern images, and thus, it is possible to detect a deviation in relative positions more accurately.

Second Modification Example

In the above embodiment and modification example, a deviation in relative positions of the optical axis 23 of the lens 20 and the reference coordinate of the modulation plane 11 is obtained by comparison between a parameter acquired from image data of a fringe pattern image and a known correlation. However, in a case of acquiring image data for many fringe pattern images while changing positions where two light spots are formed (middle position ($\eta_1$, $\xi_1$) and angle $\alpha$), it is possible to obtain a deviation in relative positions of a reference coordinate of a modulation plane 11 and an optical axis 23 when a basic characteristic of a correlation is known even in a case where detailed correlations, for example, illustrated in FIG. 5A to FIG. 10C are not previously stored in a storage unit 42.

For example, with reference to FIG. 5C illustrated in the above embodiment, it is understood that there is a region of an angle $\alpha$ in which a phase is shifted for $\pi$ (rad) and that the angle region is gradually broadened along with a variation of a coordinate $\eta_1$. When it is considered that a variation of a phase shift amount in a boundary of this angle region is steep, it is possible to identify the coordinate $\eta_1$ more accurately by detecting this variation.

Note that with reference to FIG. 6C, it is understood that no phase shift is generated in a fringe pattern image regardless of a distance NA and an angle $\alpha$. This may be because 0.6 is too small as a distance NA greatly related to a phase shift amount of a fringe pattern image and a z component is small compared to an x component and a y component. More specifically, it may be because, when $\xi_1=0$, a fringe pattern image formed by an x component and a fringe pattern image formed by a y component are in the same phase and a fringe pattern image formed by a z component is relatively shifted for $\pi$ (rad). Thus, it is considered that a variation of a phase shift amount is acquired only when a conditional expression (4) is satisfied.

$$|Ex|^2+|Ey|^2<|Ez|^2 \quad (4)$$

Further, with reference to FIG. 5A and FIG. 6A, it is understood that there is a part where the intensity amplitude is zero (or close to zero). In this part, it is considered that a conditional expression (5) is satisfied.

$$|Ex|^2+|Ey|^2=|Ez|^2 \quad (5)$$

That is, a line where the intensity amplitude becomes zero in each of FIG. 5A and FIG. 6A is considered to be identical to a boundary line where a phase illustrated in FIG. 5C is shifted for $\pi$ (rad). Thus, it is possible to accurately identify the coordinate $\eta_1$ by detecting a line where the intensity amplitude becomes zero. Note that when FIG. 5A and FIG. 6A are compared with each other, a variation in the intensity amplitude is larger in FIG. 5A than in FIG. 6A. Thus, when the distance NA is large, it becomes easy to detect the above line and it is possible to accurately identify the coordinate $\eta_1$ and the angle $\alpha$.

Further, with reference to FIG. 5B and FIG. 6B, there is a profile having a form different from any of the phase shift amount illustrated in FIG. 5C and the intensity amplitude illustrated in each of FIG. 5A and FIG. 6A. It is also possible to accurately identify the coordinate $\eta_1$ by extracting a characteristic of this profile of the intensity average. Moreover, when FIG. 5B and FIG. 6B are compared with each other, a variation in an intensity average is larger in FIG. 5B than in FIG. 6B, and thus, when the distance NA is large, it becomes easy to extract a characteristic and it is possible to accurately identify the coordinate $\eta_1$.

Further, with reference to FIG. 7C, it is understood that there is a region of an angle $\alpha$ where a phase is shifted for $\pi$ (rad) and that the angle region is gradually broadened along with a variation in the coordinate $\xi_1$. Further, it is understood that a degree of the broadening is large compared to that in FIG. 5C. When it is considered that a variation of a phase shift amount in a boundary of this angle region is steep, it is possible to identify the coordinate $\xi_1$ more accurately by detecting this variation.

Note that in a region where a moving distance of the coordinate $\xi_1$ is larger than about 0.2, a characteristic variation (part with locally large phase shift) appears in a phase shift amount, and this may be because an incident angle of a part of modulated light L2 input into the focal plane 22 exceeds a total reflection critical angle and a z component is enhanced. Further, with reference to FIG. 8C, it is understood that no phase shift is generated in a fringe pattern image similarly to FIG. 6C. The reason may be similar to that in FIG. 6C.

Further, with reference to FIG. 7A and FIG. 8A, there is a line where the intensity amplitude becomes zero (or close to zero) similarly to FIG. 5A and FIG. 6A. In this line, the above-described conditional expression (5) is satisfied, and by detection of this line, it is possible to identify a coordinate $\xi_1$ more accurately. Note that similarly to the coordinate $\eta_1$, it becomes easy to detect the above line and it is possible to accurately identify the coordinate $\xi_1$ when the distance NA is large. Further, in each of FIG. 7A and FIG. 8A, in a region in which the angle $\alpha$ is around 90°, the intensity amplitude varies steeply with respect to a variation of the coordinate $\xi_1$. Such a variation can be used for identification of a moving distance of the coordinate $\xi_1$ (that is, identification of coordinate $\xi_1$) or for discrimination from a case where the coordinate $\xi_1$ is zero.

Further, with reference to FIG. 7B and FIG. 8B, there is a profile having a form that is different from any of the phase shift amount illustrated in FIG. 7C and the intensity amplitude illustrated in each of FIG. 7A and FIG. 8A and that is also different from a case where the coordinate $\xi_1$ is zero. It is also possible to accurately identify the coordinate $\xi_1$ by extracting a characteristic of this profile of the intensity average. Moreover, similarly to the coordinate $\eta_1$, it becomes easy to extract a characteristic of a profile and it is possible to identify the coordinate $\xi_1$ accurately when the distance NA is large.

Further, each of FIG. 5A to FIG. 8C described above is substantially symmetric with respect to a line of $\alpha=90°$, however, each of FIG. 9A to FIG. 10C is asymmetric with respect to the line of $\alpha=90°$. Such a phenomenon appears in each of the case where the distance NA is 0.8 and the case where the distance NA is 0.6, and further, such a phenomenon appears in each of the intensity amplitude, the intensity average, and the phase shift amount (specifically, in region with large distance NA). From this result, it is possible to determine whether a midpoint ($\eta_1$, $\xi_1$) of two light spots is on a $\xi$-axis or an $\eta$-axis or is away from these axes (and how large distance is) by checking existence of a symmetry property and a degree of the symmetry property with respect to the line of $\alpha=90°$.

Figure 18A:
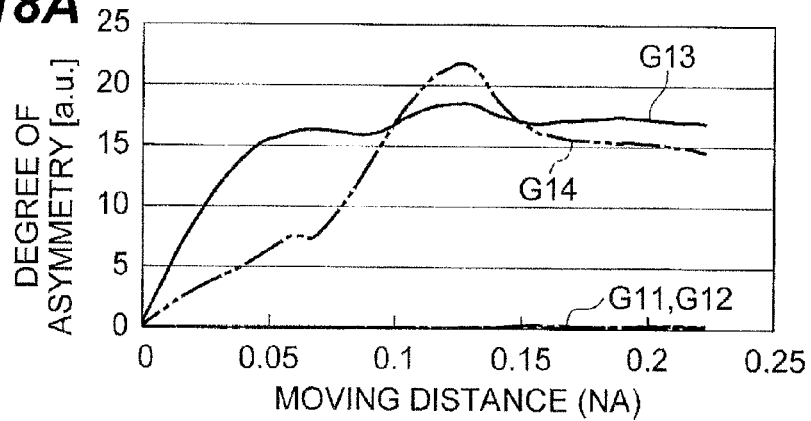
FIG. 18A to FIG. 18C are graphs illustrating relationships between a variation amount in $\eta_1$ or $\xi_1$ and a degree of asymmetry.
Figure 18B:
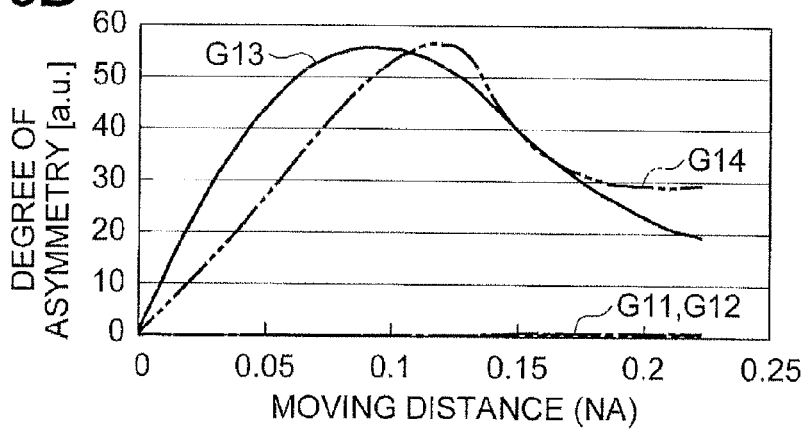
Figure 18C:
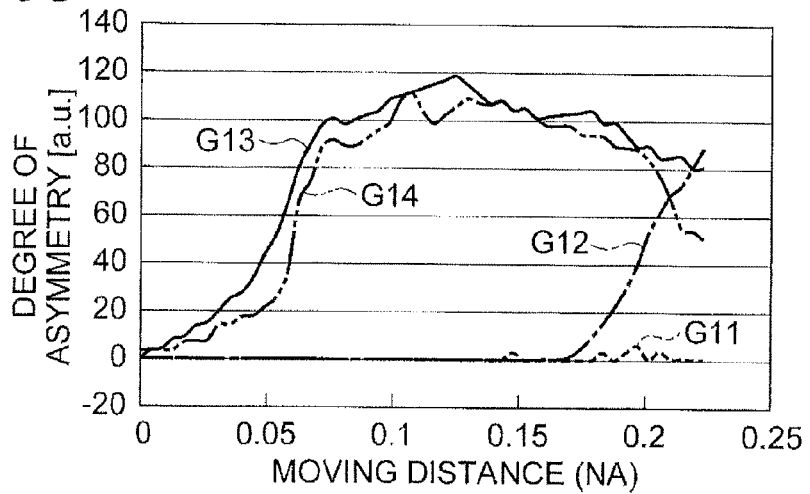

Here, FIG. 18A to FIG. 18C are graphs illustrating relationships between a variation amount of $\eta_1$ or $\xi_1$ and a degree of asymmetry in a case where the midpoint ($\eta_1$, $\xi_1$) of the two light spots is on the $\eta$-axis (graph G11), is on the $\xi$-axis (graph G12), is not on the axes and is close to the $\eta$-axis (graph G13), and is not on the axes and is close to the $\xi$-axis (graph G14). FIG. 18A is a graph for an intensity amplitude, FIG. 18B is a graph for an intensity average, and FIG. 18C is a graph for a phase shift amount.

Note that a degree of asymmetry for the intensity amplitude is defined by the following expression (6). In the expression (6), M is a variation amount (moving distance) of $\eta_1$ or $\xi_1$ and Amp (NA, M, $\alpha$) is an intensity amplitude variation that appears in an interference fringe pattern image. The larger the degree of asymmetry is, the more asymmetric it is. For a phase shift amount variation and an intensity average variation, the degrees are defined by similar expressions.

degree of asymmetry = (6)

$$\sum_{n=0}^{90} |Amp(NA, M, 90-n) - Amp(NA, M, 90+n)|$$

With reference to FIG. 18A to FIG. 18C, a variation in a degree of asymmetry with respect to a variation of $\eta_1$ or $\xi_1$ is larger in a case where a midpoint $(\eta_1, \xi_1)$ of the two light spots is not on the axes (graph G13, G14) than in a case where the midpoint is on the η-axis or the ξ-axis (graph G11, G12). Thus, it is possible to determine whether a midpoint of two light spots is on the η-axis or the ξ-axis based on a magnitude of a variation in the degree of asymmetry. Further, it is possible to determine a distance to the η-axis or the ξ-axis when the midpoint is not on the axes.

Figure 19A:
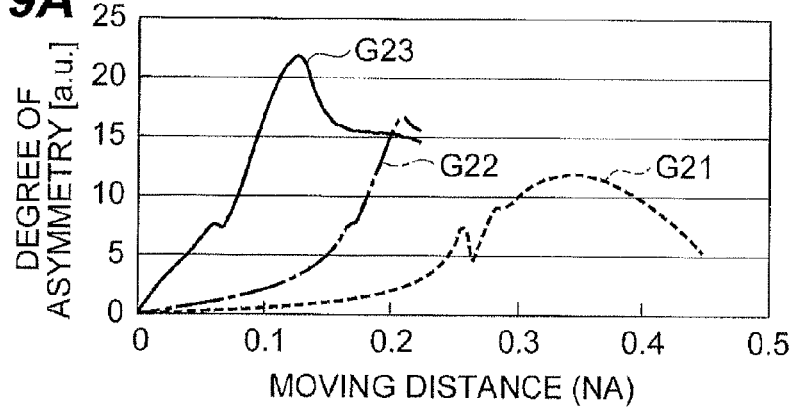
FIG. 19A to FIG. 19C are graphs illustrating relationships between a degree of asymmetry and a variation amount in $\xi_1$ in a case where a midpoint ($\eta_1$, $\xi_1$) of two light spots is not on any axis.
Figure 19B:
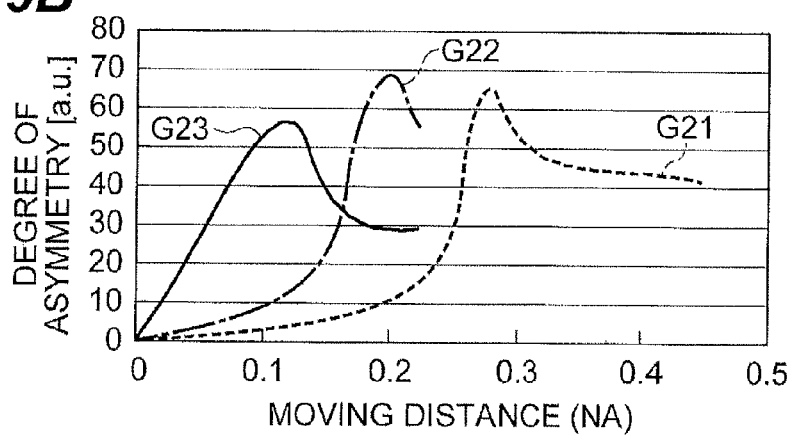
Figure 19C:
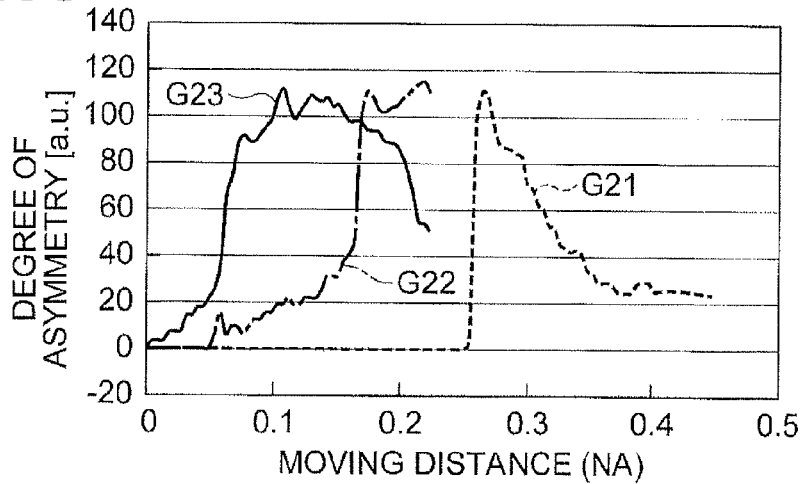

FIG. 19A to FIG. 19C are graphs illustrating relationships between a degree of asymmetry and a variation amount (moving distance) of $\xi_1$ in a case where a midpoint $(\eta_1, \xi_1)$ of two light spots is not on the axes and when a distance NA between the two light spots is 0.6 (graph G21), 0.7 (graph G22), and 0.8 (graph G23). FIG. 19A is a graph for an intensity amplitude, FIG. 19B is a graph for an intensity average, and FIG. 19C is a graph for a phase shift amount. Note that in each of these graphs, $\eta_1$ is fixed to 0.149 and the midpoint $(\eta_1, \xi_1)$ of the two light spots is moved in the ξ-axis direction with $\xi_1=0$ as an initial position.

With reference to FIG. 19A to FIG. 19C, it is understood that a slope of a curved line in each graph is increased along with an increase of the distance NA. From this characteristic, it is understood that the distance NA being large is favorable for identification of a coordinate of the midpoint $(\eta_1, \xi_1)$ of the two light spots. However, when the sum of the variation amount (moving distance) of $\xi_1$ and the distance NA exceeds 0.9, the degree of asymmetry is decreased. This phenomenon means that a dynamic range of the variation amount of $\xi_1$ is decreased while position identification accuracy is increased, when the distance NA is increased.

Further, as illustrated in FIG. 19C, since no phase shift is generated when the distance NA is small, there may be a region where the degree of asymmetry is zero. When the distance NA is 0.6, the degree of asymmetry is zero until the variation amount (moving distance) of $\xi_1$ reaches 0.25, and further, when the distance NA is 0.7, the degree of asymmetry is zero until the variation amount (moving distance) of $\xi_1$ reaches 0.05.

Figure 20:
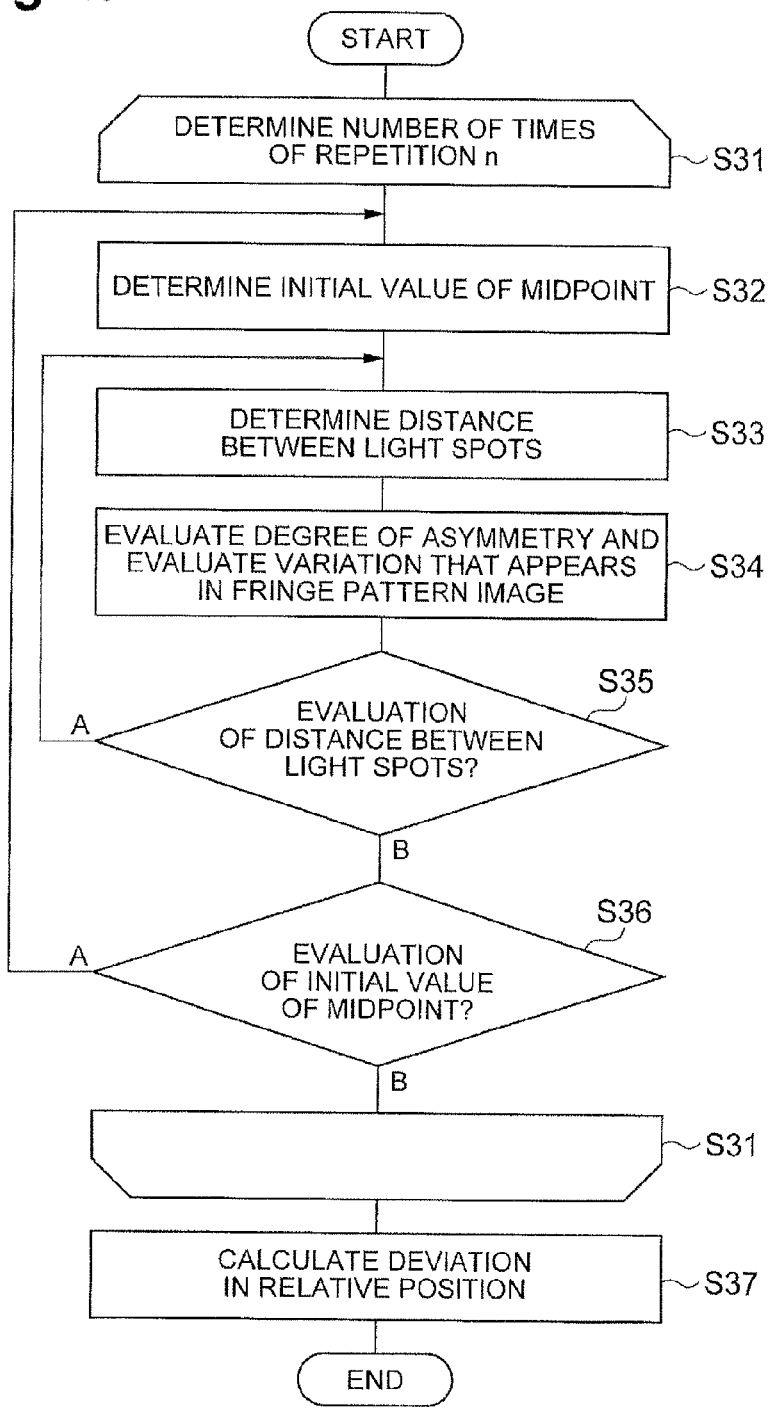
FIG. 20 is a flowchart illustrating an example of a process of obtaining a deviation in relative positions in a second modification example.

FIG. 20 is a flowchart illustrating an example of a process of calculating a deviation in relative positions in the present modification example. As illustrated in FIG. 20, first, the number of times of repetition n of step S32 to step S36 in the following (that is, number of times of acquisition of image data) is determined (step S31). Next, an initial value of the midpoint $(\eta_1, \xi_1)$ is determined (step S32) and a distance NA is determined (step S33). Then, while the midpoint $(\eta_1, \xi_1)$ is moved in the ξ-axis direction, evaluation of a degree of asymmetry and evaluation of a variation that appears in a fringe pattern image are performed. Further, while the midpoint $(\eta_1, \xi_1)$ is moved in the η-axis direction, evaluation of a degree of asymmetry and evaluation of a variation that appears in a fringe pattern image are performed. Based on these evaluations, a distance from an initial value of the midpoint $(\eta_1, \xi_1)$ to the η-axis and a distance from the initial value of the midpoint $(\eta_1, \xi_1)$ to the ξ-axis are obtained (step S34).

Subsequently, accuracy of each distance obtained in step S34 is evaluated (step S35). For example, when the degree of asymmetry or the variation that appears in the fringe pattern image is small, accuracy of each distance obtained in step S34 is decreased. In such a case, the process goes back to step S33 and the distance NA is further increased (step S35; A). Accordingly, it is possible to increase the degree of asymmetry or the variation that appears in the fringe pattern image and to increase accuracy of each distance.

Further, when the accuracy of each distance is adequate (step S35; B), then, the initial value of the midpoint $(\eta_1, \xi_1)$ is evaluated (step S36). When each distance obtained in step S34 is too large (that is, initial value of midpoint $(\eta_1, \xi_1)$ is too far away from η-axis and ξ-axis), accuracy of each distance tends to be decreased. In such a case, the process goes back to step S32 and the initial value of the midpoint $(\eta_1, \xi_1)$ is determined again in such a manner as to be closer to the η-axis and the ξ-axis (step S36; A). Accordingly, it is possible to increase accuracy of each distance obtained in step S34.

After step S31 to step S36 described above are repeated for n times, a deviation in relative positions of a reference coordinate of the modulation plane 11 and the optical axis 23 is obtained based on the acquired distance values (step S37).

A control apparatus and a control method for a spatial light modulator according to an aspect of the present invention are not limited to the above-described embodiment and may be modified in many other forms. For example, in the above embodiment, the calculation unit 41, the storage unit 42, the analysis unit 43, and the changing unit 44 are housed in one control unit 40 but may be configured separately. Further, a part or all of these may be configured integrally with the imaging device 30 or with the SLM 10.

A control apparatus for a spatial light modulator according to the above embodiment includes a lens; a spatial light modulator including a modulation plane, in which a plurality of modulation pixels is arrayed two-dimensionally, and presenting a first modulation pattern on the modulation plane and outputting first modulated light for forming a first light spot and a second light spot on a pupil plane of the lens; an imaging device including an imaging plane, in which a plurality of photoelectric conversion pixels is arrayed two-dimensionally, and imaging a first fringe pattern image formed on a focal plane of the lens by the first modulated light on the imaging plane and generating first image data indicating a light intensity distribution of the first fringe pattern image; a calculation unit calculating at least one kind of first parameter among an intensity amplitude, a phase shift amount, and an intensity average based on the first image data; an analysis unit obtaining a deviation in relative positions of an optical axis of the lens and a reference coordinate of the modulation plane based on the first parameter; and a changing unit changing an origin position of the reference coordinate on the modulation plane in such a manner that the deviation in the relative positions is decreased.

Further, a control method for a spatial light modulator according to the above embodiment includes a step of presenting a first modulation pattern on a modulation plane of a spatial light modulator and outputting first modulated light for forming a first light spot and a second light spot on a pupil plane of a lens; a step of imaging a first fringe pattern image formed on a focal plane of the lens by the first modulated light on an imaging plane of an imaging device and generating first image data indicating a light intensity distribution of the first fringe pattern image; a step of calculating at least one kind of first parameter among an intensity amplitude, a phase shift amount, and an intensity average from the first image data; a step of obtaining a deviation in relative positions of an optical axis of the lens and a reference coordinate of the modulation plane based on the first parameter; and a step of changing an origin position of the reference coordinate on the modulation plane in such a manner that the deviation in relative positions is decreased.

The above apparatus may further includes a storage unit storing a data table indicating a known correlation between the deviation in the relative positions of the optical axis of the lens and the reference coordinate of the modulation plane and the at least one kind of parameter among the intensity amplitude, the phase shift amount, and the intensity average, and the analysis unit may compare the first parameter with the data table for calculating the deviation in the relative positions.

Similarly, in the above method, in the step of obtaining the deviation in the relative positions, a data table indicating a known correlation between the deviation in the relative positions of the optical axis of the lens and the reference coordinate of the modulation plane and the at least one kind of parameter among the intensity amplitude, the phase shift amount, and the intensity average may be compared with the first parameter for calculating the deviation in the relative positions.

Accordingly, it becomes possible to accurately perform comparison of a correlation with a parameter, and thus, it is possible to detect a deviation in relative positions more accurately.

In the above apparatus, the spatial light modulator may present a second modulation pattern on the modulation plane and further output second modulated light for forming a third light spot and a fourth light spot, the imaging device may image a second fringe pattern image formed on the focal plane of the lens by the second modulated light on the imaging plane and further generate second image data indicating a light intensity distribution of the second fringe pattern image, the calculation unit may calculate at least one kind of second parameter among an intensity amplitude, a phase shift amount, and an intensity average based on the second image data, and the analysis unit may obtain the deviation in the relative positions based on the first parameter and the second parameter.

Similarly, the above method may further include a step of presenting a second modulation pattern on the modulation plane and outputting second modulated light for forming a third light spot and a fourth light spot on the pupil plane of the lens, and a step of imaging a second fringe pattern image formed on the focal plane of the lens by the second modulated light on the imaging plane of the imaging device and generating second image data indicating a light intensity distribution of the second fringe pattern image, and in the step of calculating the parameter, at least one kind of second parameter among an intensity amplitude, a phase shift amount, and an intensity average may be calculated based on the second image data, and in the step of obtaining the deviation in the relative positions, the deviation in the relative positions may be obtained based on the first parameter and the second parameter.

According to these apparatus and method, a deviation in relative positions is calculated based on parameters of two fringe pattern images different from each other, and thus, it is possible to detect a deviation in relative positions more accurately.

The above apparatus may further include a storage unit storing a data table indicating a known correlation between the deviation in the relative positions of the optical axis of the lens and the reference coordinate of the modulation plane and the at least one kind of parameter among the intensity amplitude, the phase shift amount, and the intensity average, and the analysis unit may compare the first parameter and the second parameter with the data table for calculating the deviation in the relative positions.

Similarly, in the above method, in the step of obtaining the deviation in the relative positions, a data table indicating a known correlation between the deviation in the relative positions of the optical axis of the lens and the reference coordinate of the modulation plane and the at least one kind of parameter among the intensity amplitude, the phase shift amount, and the intensity average may be compared with the first parameter and the second parameter for calculating the deviation in the relative positions.

Accordingly, it becomes possible to accurately perform comparison of a correlation with parameters of two different fringe pattern images, and thus, it is possible to detect a deviation in relative positions more accurately.

In the above apparatus and method, a position of one of the first light spot and the second light spot may be identical to a position of one of the third light spot and the fourth light spot. Even in such a case, it is possible to suitably acquire an effect according to the above apparatus and the method.

The present invention can be used as a control apparatus and a control method, for a spatial light modulator, with which it is possible to accurately make relative positions of an optical axis of a lens and a reference coordinate axis of a modulation pattern presented on an SLM match with each other.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A control apparatus for a spatial light modulator, comprising:
   a lens;
   a spatial light modulator including a modulation plane, in which a plurality of modulation pixels are arrayed two-dimensionally, and configured to modulate light based on a first modulation pattern and output first modulated light for forming a first light spot and a second light spot on a pupil plane of the lens;
   an image sensor including an imaging plane, in which a plurality of photoelectric conversion pixels are arrayed two-dimensionally, and configured to capture an image of a first fringe pattern image formed on a focal plane of the lens by the first modulated light on the imaging plane and generate first image data indicating a light intensity distribution of the first fringe pattern image; and
   a processor electrically coupled to the image sensor and the spatial light modulator, and the processor configured to:
   calculate at least one kind of first parameter among an intensity amplitude, a phase shift amount, and an intensity average based on the first image data,
   obtain a deviation in relative positions of an optical axis of the lens and a reference coordinate of the modulation plane based on the first parameter, and
   control an origin position of the reference coordinate on the modulation plane so that the deviation in the relative positions is decreased.

2. The control apparatus according to claim 1, further comprising a storage configured to store a data table indicating a known correlation between the deviation in the relative positions of the optical axis of the lens and the reference coordinate of the modulation plane and the at least one kind of parameter among the intensity amplitude, the phase shift amount, and the intensity average, wherein
the processor compares the first parameter with the data table for calculating the deviation in the relative positions.

3. The control apparatus according to claim 1, wherein the spatial light modulator modulates light based on a second modulation pattern and further outputs second modulated light for forming a third light spot and a fourth light spot,
the image sensor captures an image of a second fringe pattern image formed on the focal plane of the lens by the second modulated light on the imaging plane and further generates second image data indicating a light intensity distribution of the second fringe pattern image, and
the processor calculates at least one kind of second parameter among an intensity amplitude, a phase shift amount, and an intensity average based on the second image data, and
obtains the deviation in the relative positions based on the first parameter and the second parameter.

4. The control apparatus according to claim 3, further comprising a storage configured to store a data table indicating a known correlation between the deviation in the relative positions of the optical axis of the lens and the reference coordinate of the modulation plane and the at least one kind of parameter among the intensity amplitude, the phase shift amount, and the intensity average, wherein
the processor compares the first parameter and the second parameter with the data table for calculating the deviation in the relative positions.

5. The control apparatus according to claim 3, wherein a position of one of the first light spot and the second light spot is identical to a position of one of the third light spot and the fourth light spot.

6. A control method for a spatial light modulator, comprising:
modulating light, by a spatial light modulator, based on a first modulation pattern;
outputting first modulated light for forming a first light spot and a second light spot on a pupil plane of a lens from the spatial light modulator;
capturing an image of a first fringe pattern image formed on a focal plane of the lens by the first modulated light on an imaging plane of an image sensor;
generating first image data indicating a light intensity distribution of the first fringe pattern image;
calculating at least one kind of first parameter among an intensity amplitude, a phase shift amount, and an intensity average from the first image data;
obtaining a deviation in relative positions of an optical axis of the lens and a reference coordinate of the modulation plane based on the first parameter; and
controlling an origin position of the reference coordinate on the modulation plane so that the deviation in relative positions is decreased.

7. The control method according to claim 6, wherein in the obtaining, a data table indicating a known correlation between the deviation in the relative positions of the optical axis of the lens and the reference coordinate of the modulation plane and the at least one kind of parameter among the intensity amplitude, the phase shift amount, and the intensity average is compared with the first parameter for calculating the deviation in the relative positions.

8. The control method according to claim 6, further comprising:
modulating light, by the spatial light modulator, based on a second modulation pattern;
outputting second modulated light for forming a third light spot and a fourth light spot on the pupil plane of the lens from the spatial light modulator;
capturing an image of a second fringe pattern image formed on the focal plane of the lens by the second modulated light on the imaging plane of the image sensor;
generating second image data indicating a light intensity distribution of the second fringe pattern image; and
calculating at least one kind of second parameter among an intensity amplitude, a phase shift amount, and an intensity average based on the second image data, wherein
in the obtaining, the deviation in the relative positions is obtained based on the first parameter and the second parameter.

9. The control method according to claim 8, wherein in the obtaining, a data table indicating a known correlation between the deviation in the relative positions of the optical axis of the lens and the reference coordinate of the modulation plane and the at least one kind of parameter among the intensity amplitude, the phase shift amount, and the intensity average is compared with the first parameter and the second parameter for calculating the deviation in the relative positions.

10. The control method according to claim 8, wherein a position of one of the first light spot and the second light spot is identical to a position of one of the third light spot and the fourth light spot.

* * * * *